US011012253B2

(12) United States Patent
Teicher

(10) Patent No.: US 11,012,253 B2
(45) Date of Patent: *May 18, 2021

(54) CONTROLLER FOR SMART DEVICES

(71) Applicant: Mordechai Teicher, Hod-Hasharon (IL)

(72) Inventor: Mordechai Teicher, Hod-Hasharon (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/914,584

(22) Filed: Jun. 29, 2020

(65) Prior Publication Data

US 2020/0336332 A1 Oct. 22, 2020

Related U.S. Application Data

(63) Continuation of application No. 16/512,409, filed on Jul. 16, 2019, now Pat. No. 10,742,442, which is a continuation-in-part of application No. 16/016,680, filed on Jun. 25, 2018, now Pat. No. 10,620,798, which is a continuation-in-part of application No. 15/806,357, filed on Nov. 8, 2017, now Pat. No. 10,025,471.

(60) Provisional application No. 62/575,432, filed on Oct. 21, 2017.

(51) Int. Cl.
*H04L 12/28* (2006.01)
*H04L 12/24* (2006.01)

(52) U.S. Cl.
CPC ...... *H04L 12/2832* (2013.01); *H04L 12/2807* (2013.01); *H04L 12/2827* (2013.01); *H04L 41/0695* (2013.01)

(58) Field of Classification Search
CPC ............. H04L 12/2832; H04L 12/2807; H04L 12/2827
See application file for complete search history.

(56) References Cited

U.S. PATENT DOCUMENTS

| 9,236,932 | B2* | 1/2016 | Thomas | H04B 7/15 |
| 9,361,521 | B1 | 6/2016 | McLean et al. | |
| 10,042,336 | B2* | 8/2018 | Cipollo | H04L 12/2829 |
| 10,102,585 | B1* | 10/2018 | Bryant | G06Q 10/10 |
| 2003/0050737 | A1 | 3/2003 | Osann | |
| 2003/0095211 | A1* | 5/2003 | Nakajima | H04N 5/4403 |
| | | | | 348/734 |
| 2005/0096753 | A1* | 5/2005 | Arling | H04L 12/282 |
| | | | | 700/11 |
| 2007/0112939 | A1* | 5/2007 | Wilson | H04L 12/2807 |
| | | | | 709/219 |

(Continued)

OTHER PUBLICATIONS

Apple Inc., HomeKit Accessory Protocol Specification (Non-Commercial Version), Release R1, Jun. 7, 2017.

(Continued)

*Primary Examiner* — Andrea N Long

(57) ABSTRACT

A controller for connecting to and controlling active units of smart devices according to a spreadsheet received from a programming device and stored in the controller's memory and current states received from other smart devices. The controller may operate to provide to programming devices the spreadsheet stored in the memory for restoring a cluster of smart devices. The controller may include a real-time clock and interpret spreadsheet formulas that include time parameters.

6 Claims, 25 Drawing Sheets

(56) References Cited

U.S. PATENT DOCUMENTS

| | | | |
|---|---|---|---|
| 2008/0140797 A1* | 6/2008 | Ha | H04L 12/2825 709/208 |
| 2008/0164980 A1* | 7/2008 | Ha | H04L 12/66 340/286.02 |
| 2010/0082537 A1 | 4/2010 | Lasser | |
| 2010/0298957 A1* | 11/2010 | Sanchez Rocha | H04L 12/12 700/90 |
| 2011/0211584 A1 | 9/2011 | Mahmoud | |
| 2011/0295904 A1 | 12/2011 | Mohan | |
| 2012/0110428 A1 | 5/2012 | Meijer | |
| 2012/0151314 A1 | 6/2012 | Campbell et al. | |
| 2013/0151068 A1* | 6/2013 | Lee | B60K 37/02 701/36 |
| 2013/0219438 A1 | 8/2013 | Arling et al. | |
| 2013/0245796 A1 | 9/2013 | Lentzitzky et al. | |
| 2013/0262975 A1 | 10/2013 | Rochelle et al. | |
| 2014/0064738 A1 | 3/2014 | Chen et al. | |
| 2014/0066062 A1 | 3/2014 | Chen et al. | |
| 2014/0098247 A1 | 4/2014 | Rao et al. | |
| 2014/0108019 A1 | 4/2014 | Ehsani et al. | |
| 2014/0176337 A1* | 6/2014 | Valin | F24S 40/20 340/870.02 |
| 2014/0244001 A1 | 8/2014 | Glickfield et al. | |
| 2014/0369231 A1 | 12/2014 | Chen et al. | |
| 2015/0100173 A1 | 4/2015 | Tubi et al. | |
| 2015/0256665 A1 | 9/2015 | Pera | |
| 2015/0365480 A1* | 12/2015 | Soto | H04L 12/281 709/224 |
| 2016/0055140 A1 | 2/2016 | McKenzie et al. | |
| 2016/0139575 A1 | 5/2016 | Funes | |
| 2016/0182247 A1 | 6/2016 | Cregg | |
| 2016/0183030 A1 | 6/2016 | Cregg | |
| 2016/0249286 A1 | 8/2016 | Chen | |
| 2016/0261425 A1* | 9/2016 | Horton | G05D 23/1917 |
| 2016/0284206 A1 | 9/2016 | Boettcher et al. | |
| 2016/0292240 A1 | 10/2016 | Diwan et al. | |
| 2016/0364114 A1 | 12/2016 | Von Dehsen et al. | |
| 2017/0026195 A1 | 1/2017 | Pan | |
| 2017/0132194 A1 | 5/2017 | Lee | |
| 2017/0299210 A1* | 10/2017 | Nyamjav | H04L 12/282 |
| 2018/0087795 A1 | 3/2018 | Okita et al. | |

OTHER PUBLICATIONS

PCT/IB18/54734 International Search Report and Written Opinion dated Dec. 20, 2018.

\* cited by examiner

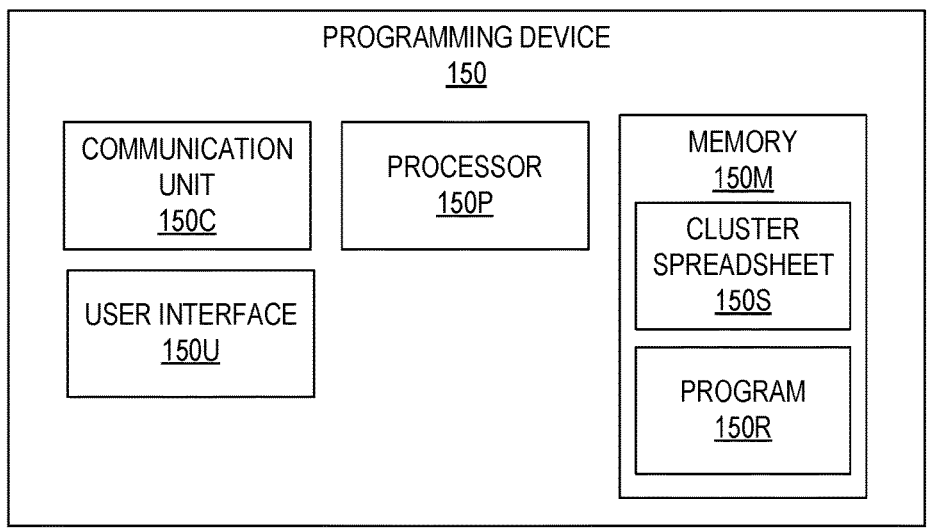
FIG. 2A
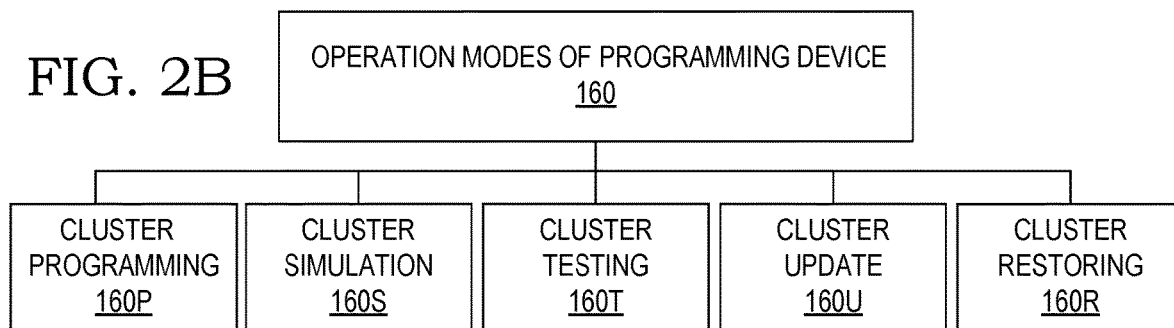
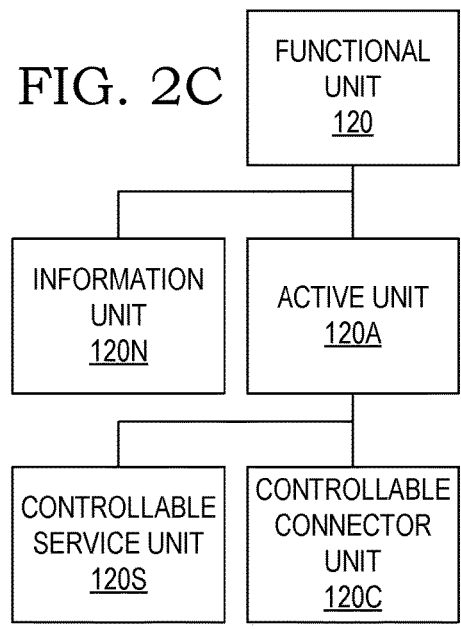
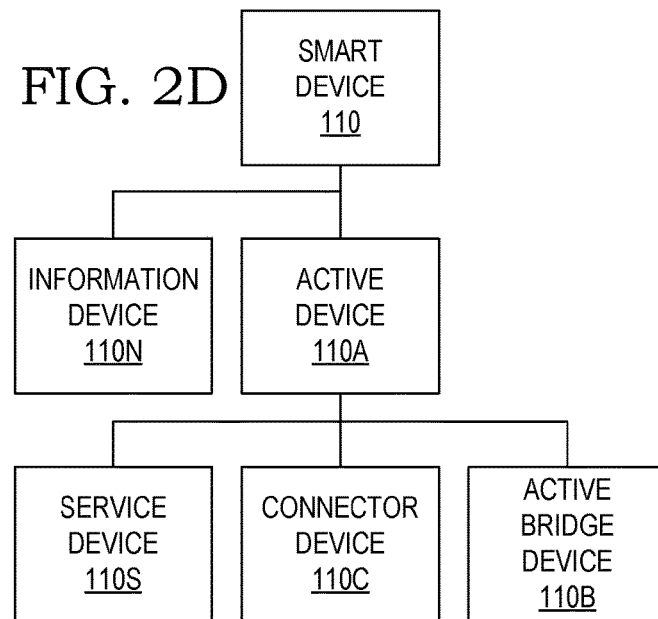

|    | A | B | C | D | E |
|----|---|---|---|---|---|
| 1  | Vendor | V | V | V | V |
| 2  | Device | V | V | V | V |
| 3  | Functional unit | V | V | V | V |
| 4  | Functional unit ID | V | V | V | V |
| 5  | Type | V | V | V | V |
| 6  | Health | D | D | D | D |
| 7  | User-given name | U | U | U | U |
| 8  | State format | V(U) | V(U) | V(U) | V(U) |
| 9  | Min value | V | V | V | V |
| 10 | Max value | V | V | V | V |
| 11 | Step | V | V | V | V |
| 12 | Legend | V | V | V | V |
| 13 | Default state | V/U | V/U | V/U | V/U |
| 14 | Current state | U/D | U/D | U/D | U/D |
| 15 | Time of last change | U/D | U/D | U/D | U/D |
| 16 | Target state calc | (U) | (U) | (U) | (U) |
| 17 | Current time | U/D | | | |
| 18 | | U | U | U | U |
| 19 | | U | U | U | U |
| 20 | | U | U | U | U |
| 21 | | U | U | U | U |
| 22 | | U | U | U | U |
| 23 | | U | U | U | U |
| 24 | | U | U | U | U |
| 25 | | U | U | U | U |

| | ABC Switches |
|---|---|
| | Light switch |
| | Light switch |
| | Info |
| | |
| | |
| | Integer |
| | 0 |
| | 1 |
| | 1 |
| | 0=OFF, 1=ON |
| | 0 |
| | 0 |

| | A | B | C | D | E |
|---|---|---|---|---|---|
| 1 | Vendor | ABC Switches | XYZ Thermometers | RRR Fans | RRR Fans |
| 2 | Device | Light switch | Thermometer | Ceiling Fan | Ceiling Fan |
| 3 | Functional unit | Light switch | Thermometer | Fan | Light |
| 4 | Functional unit ID | | | | |
| 5 | Type | Info | Info | Active | Active |
| 6 | Health | | | | |
| 7 | User-given name | | | | |
| 8 | State format | Integer | 00.0; Fahrenheit | Integer | Integer |
| 9 | Min value | 0 | | 0 | 0 |
| 10 | Max value | 1 | | 3 | 2 |
| 11 | Step | 1 | | 1 | 1 |
| 12 | Legend | 0=OFF, 1=ON | | 0=OFF,..., 3=HIGH | 0=OFF,..., 2=MAX |
| 13 | Default state | 0 | 65.0 | 0 | 0 |
| 14 | Current state | 0 | 65.0 | 0 | 0 |
| 15 | Time of last change | | | | |
| 16 | Target state calc | (none) | (none) | | |
| 17 | Current time | | | | |
| 18 | | | | | |
| 19 | | | | | |
| 20 | | | | | |
| 21 | | | | | |
| 22 | | | | | |
| 23 | | | | | |
| 24 | | | | | |
| 25 | | | | | |

FIG. 3B

|    | A | B | C | D | E |
|----|---|---|---|---|---|
| 1  | Vendor | ABC Switches | XYZ Thermometers | RRR Fans | RRR Fans |
| 2  | Device | Light switch | Thermometer | Ceiling Fan | Ceiling Fan |
| 3  | Functional unit | Light switch | Thermometer | Fan | Light |
| 4  | Functional unit ID | | | | |
| 5  | Type | Info | Info | Active | Active |
| 6  | Health | OK | OK | OK | OK |
| 7  | User-given name | Living room switch | Living room temp | Living room light | Living room fan |
| 8  | State format | Integer | 00.0; Fahrenheit | Integer | Integer |
| 9  | Min value | 0 | | 0 | 0 |
| 10 | Max value | 1 | | 3 | 2 |
| 11 | Step | 1 | | 1 | 1 |
| 12 | Legend | 0=OFF, 1=ON | | 0=OFF,..., 3=HIGH | 0=OFF,..., 2=MAX |
| 13 | Default state | 0 | 65 | 0 | 0 |
| 14 | Current state | 1 | 80 | 0 | 0 |
| 15 | Time of last change | 2017-10-17 8:30:00 | 2017-10-17 9:30:00 | 2017-10-17 8:00:00 | 2017-10-17 10:30:00 |
| 16 | Target state calc | (none) | (none) | =IF(E16=0,0,(IF(C14<=68,0,(IF(C14<=75,1,(IF(C14<=80,2,3)))))) | =IF(B14=0,0,B20) |
| 17 | Current time | =NOW() | | | |
| 18 | | | | | |
| 19 | Current hour: | =HOUR(B17) | | | |
| 20 | Light by the hour: | =IF(AND(B19>B22,B19<B23),1,2) | | | |
| 21 | | | | | |
| 22 | Sunrise hour: | 6 | | | |
| 23 | Sunset hour: | 19 | | | |
| 24 | | | | | |
| 25 | | | | | |

FIG. 3D

|   | A | B | C | D | E |
|---|---|---|---|---|---|
| 1 | Vendor | ABC Switches | XYZ Thermometers | RRR Fans | RRR Fans |
| 2 | Device | Light switch | Thermometer | Ceiling Fan | Ceiling Fan |
| 3 | Functional unit | Light switch | Thermometer | Fan | Light |
| 4 | Functional unit ID | | | | |
| 5 | Type | Info | Info | Active | Active |
| 6 | Health | OK | OK | OK | OK |
| 7 | User-given name | Living room switch | Living room temp | Living room light | Living room fan |
| 8 | State format | Integer | 00.0; Fahrenheit | Integer | Integer |
| 9 | Min value | 0 | | 0 | 0 |
| 10 | Max value | 1 | | 3 | 2 |
| 11 | Step | 1 | | 1 | 1 |
| 12 | Legend | 0=OFF, 1=ON | | 0=OFF,..., 3=HIGH | 0=OFF,..., 2=MAX |
| 13 | Default state | 0 | 65.0 | 0 | 0 |
| 14 | Current state | 1 | 80.0 | 0 | 0 |
| 15 | Time of last change | 2017-10-17 8:30:00 | 2017-10-17 9:30:00 | 2017-10-17 8:00:00 | 2017-10-17 10:30:00 |
| 16 | Target state calc | (none) | (none) | 2 | 1 |
| 17 | Current time | 2017-10-17 11:15:00 | | | |
| 18 | | | | | |
| 19 | Current hour: | 11 | | | |
| 20 | Light by the hour: | 1 | | | |
| 21 | | | | | |
| 22 | Sunrise hour: | 6 | | | |
| 23 | Sunset hour: | 19 | | | |
| 24 | | | | | |
| 25 | | | | | |

FIG. 3E

|   | A | B | C | D | E |
|---|---|---|---|---|---|
| 1 | Vendor | ABC Switches | XYZ Thermometers | RRR Fans | RRR Fans |
| 2 | Device | Light switch | Thermometer | Ceiling Fan | Ceiling Fan |
| 3 | Functional unit | Light switch | Thermometer | Fan | Light |
| 4 | Functional unit ID | 543999770 | 362907445 | 838484724F | 838484724L |
| 5 | Type | Info | Info | Active | Active |
| 6 | Health | (as recorded) | (as recorded) | (as recorded) | (as recorded) |
| 7 | User-given name | Living room switch | Living room temp | Living room light | Living room fan |
| 8 | State format | Integer | 00.0; Fahrenheit | Integer | Integer |
| 9 | Min value | 0 | | 0 | 0 |
| 10 | Max value | 1 | | 3 | 2 |
| 11 | Step | 1 | | 1 | 1 |
| 12 | Legend | 0=OFF, 1=ON | | 0=OFF,..., 3=HIGH | 0=OFF,..., 2=MAX |
| 13 | Default state | 0 | 65 | 0 | 0 |
| 14 | Current state | (as recorded) | (as recorded) | (as recorded) | (as recorded) |
| 15 | Time of last change | (as recorded) | (as recorded) | (as recorded) | (as recorded) |
| 16 | Target state calc | (none) | (none) | =IF(E16=0,0,(IF(C14<=68,0,(IF(C14<=75,1,(IF(C14<=80,2,3)))))) | =IF(B14=0,0,B20) |
| 17 | Current time | =NOW() | | | |
| 18 | | | | | |
| 19 | Current hour: | =HOUR(B17) | | | |
| 20 | Light by the hour: | =IF(AND(B19>B22,B19<B23),1,2) | | | |
| 21 | | | | | |
| 22 | Sunrise hour: | 6 | | | |
| 23 | Sunset hour: | 19 | | | |
| 24 | | | | | |
| 25 | | | | | |

FIG. 3F

```
Vendor,ABC Switches,XYZ Thermometers,RRR Fans,RRR Fans,,,
Device,Light switch,Thermometer,Ceiling Fan,Ceiling Fan,,,
Functional unit,Light switch,Thermometer,Fan,Light,,,
Functional unit ID,543999770,362907445,838484724F,838484724L,,,
Type,Info,Info,Active,Active,,,
Health,,,,,,,
User-given name,Living room switch,Living room temp,Living room light,Living room fan,,,
State format,Integer,00.0: Fahrenheit,Integer,Integer,,,
Min value,0,,0,0,,,
Max value,1,,3,2,,,
Step,1,,1,1,,,
Legend,"0=OFF, 1=ON",,"0=OFF, 3=HIGH","0=OFF, 2=MAX",,,
Default state,0,65,0,0,,,
Current state,,,,,,,
Time of last change,,,,,,,
Target state calc,(none),(none),"=IF(E16=0,0,(IF(C14<=68,0,(IF(C14<=75,1,(IF(C14<=80,2,3)))))))","=IF(B14=0,0,B20)",,,
Current time,=NOW(),,,,,, ,,,,,,,
Current hour:,=HOUR(B17),,,,,
Light by the hour:,"=IF(AND(B19>B22,B19<B23),1,2)",,,,, ,,,,,,,
Sunrise hour:,6,,,,,
Sunset hour:,19,,,,,

```
Vendor,Device,Functional unit,Functional unit ID,Type,Health,User-given
name,State format,Min value,Max value,Step,Legend,Default state,Current
state,Time of last change,Target state calc,Current time,,Current hour:,Light
by the hour:,,Sunrise hour:,Sunset hour:

ABC Switches,Light switch,Light switch,543999770,Info,(as recorded),Living room
switch,Integer,0,1,1,"0=OFF, 1=ON",0,(as recorded),(as
recorded),(none),=NOW(),,=HOUR(Q2),"=IF(AND(S2>V2,S2<W2),1,2)",,6,19

XYZ Thermometers,Thermometer,Thermometer,362907445,Info,(as recorded),Living
room temp,00.0; Fahrenheit,,,,,65,(as recorded),(as recorded),(none),,,,,,, RRR Fans,Ceiling Fan,Fan,838484724F,Active,(as recorded),Living room
light,Integer,0,3,1,"0=OFF,?, 3=HIGH",0,(as recorded),(as
recorded),"=IF(P5=0,0,(IF(N3<=68,0,(IF(N3<=75,1,(IF(N3<=80,2,3))))))",,,,,,, RRR Fans,Ceiling Fan,Light,838484724L,Active,(as recorded),Living room
fan,Integer,0,2,1,"0=OFF,?, 2=MAX",0,(as recorded),(as
recorded),"=IF(N2=0,0,T2)",,,,,,,
```

FIG. 3H

```
,,,,,,
,,,,,,
,,,,,,
,543999770,362907445,838484724F,838484724L,,,
,,,,,,
,,,,,,
,,,,,,
,,,,,,
,,,,,,
,,,,,,
,,,,,,
,0,65,0,0,,,
,,,,,,
,,,,,,
,,,"=IF(E16=0,0,(IF(C14<=68,0,(IF(C14<=75,1,(IF(C14<=80,2,3))))))","=IF(B14=0,0,B20)",,,
,=NOW(),,,,,,
,,,,,,
,=HOUR(B17),,,,,,
,"=IF(AND(B19>B22,B19<B23),1,2)",,,,,,
,,,,,,
,6,,,,,,
,19,,,,,,
,,,,,,
,,,,,,
```

FIG. 3J

|  | A | B | C |
|---|---|---|---|
| 1 | Vendor | FFF Fans | TTT Thermo |
| 2 | Device | Ceiling fan | Ambient thermometer |
| 3 | Functional unit | Fan | Thermometer |
| 4 | Functional unit ID | | |
| 5 | Type | Active | Info |
| 6 | Health | | |
| 7 | User-given name | | |
| 8 | State format | Integer | 00.0; Celsius |
| 9 | Min value | 0 | |
| 10 | Max value | 1 | |
| 11 | Step | 1 | |
| 12 | Legend | 0=off; 1=on | |
| 13 | Default state | 0 | 20 |
| 14 | Current state | | |
| 15 | Time of last change | | |
| 16 | Target state calc | | |

800B

| | A | B | C | D |
|---|---|---|---|---|
| 1 | Vendor | FFF Fans | TTT Thermo | Virtual |
| 2 | Device | Ceiling fan | Ambient thermometer | Ambient thermometer |
| 3 | Functional unit | Fan | Thermometer | Thermometer |
| 4 | Functional unit ID | | | |
| 5 | Type | Active | Info | Info |
| 6 | Health | | | |
| 7 | User-given name | Room fan | Room temp Celsius | Room temp Fahrenheit |
| 8 | State format | Integer | 00.0; Celsius | 00.0; Fahrenheit |
| 9 | Min value | 0 | | |
| 10 | Max value | 1 | | |
| 11 | Step | 1 | | |
| 12 | Legend | 0=off; 1=on | | |
| 13 | Default state | 0 | 25 | =C13*9/5+32 |
| 14 | Current state | 0 | 22 | =C14*9/5+32 |
| 15 | Time of last change | | | =C15 |
| 16 | Target state calc | =IF(D14>80,1,0) | | |

| | A | B | C | D |
|---|---|---|---|---|
| 1 | Vendor | FFF Fans | TTT Thermo | Virtual |
| 2 | Device | Ceiling fan | Ambient thermometer | Ambient thermometer |
| 3 | Functional unit | Fan | Thermometer | Thermometer |
| 4 | Functional unit ID | | | |
| 5 | Type | Active | Info | Info |
| 6 | Health | | | |
| 7 | User-given name | Room fan | Room temp Celsius | Room temp Fahrenheit |
| 8 | State format | Integer | 00.0; Celsius | 00.0; Fahrenheit |
| 9 | Min value | 0 | | |
| 10 | Max value | 1 | | |
| 11 | Step | 1 | | |
| 12 | Legend | 0=off; 1=on | | |
| 13 | Default state | 0 | 25.0 | 77.0 |
| 14 | Current state | 0 | 22.0 | 71.6 |
| 15 | Time of last change | | | |
| 16 | Target state calc | 0 | | |

FIG. 8C

|   | A | B | C | D |
|---|---|---|---|---|
| 1 | Vendor | FFF Fans | TTT Thermo | User |
| 2 | Device | Ceiling fan | Ambient thermometer | Ambient thermometer |
| 3 | Functional unit | Fan | Thermometer | Thermometer |
| 4 | Functional unit ID | | 362907445 | 362907445(U-01) |
| 5 | Type | Active | Info | Info |
| 6 | Health | | | |
| 7 | User-given name | Room fan | Room temp Celsius | Room temp Fahrenheit |
| 8 | State format | Integer | 00.0; Celsius | 00.0; Fahrenheit |
| 9 | Min value | 0 | | |
| 10 | Max value | 1 | | |
| 11 | Step | 1 | | |
| 12 | Legend | 0=off; 1=on | | |
| 13 | Default state | 0 | 25 | =C13*9/5+32 |
| 14 | Current state | 0 | 22 | =C14*9/5+32 |
| 15 | Time of last change | | | =C15 |
| 16 | Target state calc | =IF(D14>80,1,0) | | |

FIG. 9A

|   | A | B | C | D |
|---|---|---|---|---|
| 1 | | | | |
| 2 | | | | |
| 3 | | | | |
| 4 | | | 362907445 | 362907445(U-01) |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | =C13*9/5+32 |
| 14 | | | | =C14*9/5+32 |
| 15 | | | | =C15 |
| 16 | | | | |

FIG. 9B

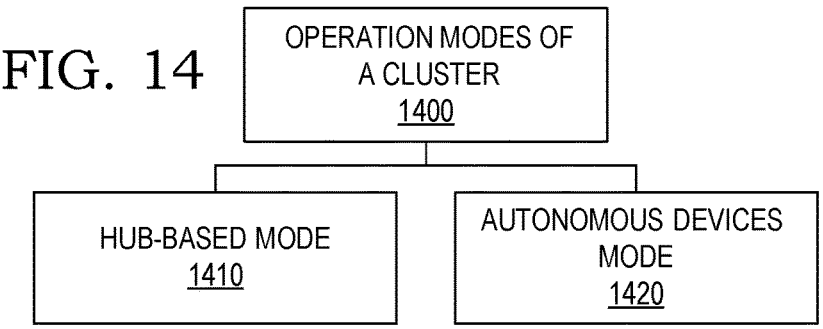

FIG. 14

DEVICE COOPERATION PROGRAM DERIVED FROM CLUSTER COOPERATION PROGRAM
1500

DEVICE COOPERATION PROGRAM ≈ CLUSTER COOPERATION PROGRAM
1504

DEVICE COOPERATION PROGRAM = CLUSTER COOPERATION PROGRAM
1510

FIG. 15

A CLUSTER COOPERATION PROGRAM IS PROGRAMMED
1601

SMART DEVICES OF A CLUSTER ARE DEPLOYED AND COMMUNICATION IS ESTABLISHED AND TESTED
1605

THE CLUSTER OPERATES AND IS TESTED IN HUB-BASED MODE; THE CLUSTER COOPERATION PROGRAM IS UPDATED AS NEEDED
1609

DEVICE COOPERATION PROGRAMS ARE DERIVED FROM THE CLUSTER COOPERATION PROGRAM AND ARE DISTRIBUTED TO ACTIVE DEVICES
1613

THE SMART DEVICES COOPERATE IN AUTONOMOUS MODE ACCORDING TO THE DEVICE COOPERATION PROGRAMS
1617

FIG. 16

CONTROLLER FOR SMART DEVICES

REFERENCE TO RELATED APPLICATIONS

This application is a continuation of application Ser. No. 16/512,409 filed on Jul. 16, 2019, which is a continuation-in-part of application Ser. No. 16/016,680 filed on Jun. 25, 2018, now U.S. Pat. No. 10,620,798, which is a continuation-in-part of application Ser. No. 15/806,357 filed on Nov. 8, 2017, now U.S. Pat. No. 10,025,471, which claims the benefit of U.S. provisional patent application 62/575,432 filed on Oct. 21, 2017.

BACKGROUND OF THE INVENTION

Field of the Invention

The present invention relates to smart devices, and in particular to cooperation among smart devices.

Description of Related Art

The Internet of Things (IoT) is a network of physical devices embedded with electronics, software, sensors, actuators, and network connectivity which enable these devices to collect and exchange data and perform actions. The smart home, also known as home automation or domotics, is a subset of IoT, focusing on the control and automation of residential lighting, heating, ventilation, air conditioning, security, appliances and gadgets.

Presently, the control hub that manages cooperation among smart devices in the smart home and other IoT applications costs money to acquire and install, reduces reliability by introducing a single point of failure, and impedes interoperability because of conflicting commercial interests among control hub providers.

Furthermore, while one can easily switch-on his living room lights from the other side of the city or the world and get anywhere a message from his alarm system whenever the front door opens, they will have a hard time, and may need to hire a professional programmer, for having the living room light automatically switch on as the front door opens, if such cooperation has not been preprogrammed into a smart home hub that controls the devices.

There is thus a need for systems and functionalities that reduce the costs, increase reliability and interoperability and improve the manageability by users of cooperation among smart devices in the smart home and other IoT applications.

BRIEF SUMMARY OF THE INVENTION

The present invention introduces clusters of smart devices that can switch between hub-based and hub-less modes of operation, for testing purposes and improved robustness.

According to a first aspect, the present disclosure teaches eliminating control hubs via autonomous cooperation among smart devices, where each active smart device decides by itself and for itself how to respond to state changes reported by other smart devices. Eliminating control hubs reduces the cost and improves the reliability and interoperability of clusters of cooperating smart devices.

According to a second advantageous aspect, the present disclosure teaches improving manageability by users of simpler clusters of smart devices by using spreadsheets for programming the cooperation among smart devices, so that many users that are not professional programmers can set up smart devices to cooperate according to the users' requirements and preferences. The level of skill required for setting up smart devices according to the second aspect is that of spreadsheet users, where more experienced and capable spreadsheet users turn into more sophisticated users of the second aspect of the present invention.

According to a third aspect, a cluster of smart devices is devised to operate in both hub-based and hub-less modes. On the one hand, a cluster designed for hub-less operation is tested in hub-based mode, using a programming device as a temporary control hub; on the other hand, active devices of a cluster designed for hub-based operation are prepared to switch to hub-less operation as a fallback provision for communication problems or hub malfunction.

A "smart device" herein is an integral physical thing that includes a memory, processor and communication unit, collectively called "controller", and zero or more electrically-operated "functional unit" controlled by the processor. All elements described herein as included in a smart device are contained in a common enclosure and/or are physically attached to each other. A smart device having no functional unit is called herein a "bridge smart device" abbreviated "bridge device" and is devised to cooperate with external device(s). A functional unit is either an "information unit" that measures, collects, detects, receives, downloads or otherwise obtains useful information that may affect the operation of other devices, or an "active unit" that controllably performs an action. Active units included in active devices are further categorized into a "controllable service unit" whose action provides a tangible useful service that directly benefits users, and "controllable connector unit", such as an electronically-actuated switch or valve, whose action affects the supply of a resource, such as electricity or water, that is consumed by the provision of a tangible useful service by an "external active device" that includes an active unit that is a service unit that provides a tangible useful service, as well as optionally an "alien controller" that controls the service unit yet is not directly programmed and operating according to the teachings of the present disclosure, such as an alien irrigation timer. Alternatively, a service unit of an external active device may be a dumb service unit, such as a conventional sprinkler, light or fan, that has no controller of its own but is indirectly controlled by a connector device that controls the supply of a resource such as water or electricity. An "active smart device", abbreviated "active device", is herein a smart device that includes at least one active unit. An "information smart device", abbreviated "information device", is herein a smart device that includes one or more information units and no active unit. An "active bridge device" is herein a smart device that includes a controller and no functional unit of its own and selectably sends control signals to an external active device that includes an active unit that is a controllable service unit that provides a tangible useful service. An "information bridge device" is a smart device that includes a controller and no functional unit of its own and communicates with external information device(s) to obtain information. A "service device" includes a controller and at least one controllable service unit, while a "connector device" includes a controller and exactly one controllable connector unit.

Smart devices communicate with other devices via communication links such as Bluetooth LE, Wi-Fi, infrared, sound, wired connection, powerline connection, text messaging, or any other technology that may move data among devices.

A smart device may include several functional units embodied as distinct hardware pieces, such as a ceiling fan that includes both a fan unit and a lighting unit and a controller that controls both, while a single hardware piece may serve as multiple functional units, for example, a camera that serves as both a license plate reader and a motion detector.

Each functional unit has a "state" parameter that measures or characterizes or specifies the condition or situation or output of the functional unit. Non-limiting examples are numeric states in case of a temperature sensor; textual states, such as {, 'low', 'med', 'high'}, in case of an air conditioner; or an alphanumeric expression in the case of a license plate reader. More complex state parameters, such as vectors or matrices or databases, may be used in more complex applications, for example in manufacturing or traffic control systems or in an autonomous car. A "current state" of a functional unit is the current condition or situation or output of a functional unit, while a "target state" of an active unit is a state to be reached or executed by the active unit or otherwise affect the state of the active unit. A current state of a functional unit is reported by the communication unit of a smart device that includes or otherwise controls the functional unit, to possibly affect the state of other functional unit(s). The target state of an active unit is autonomously calculated by the controller of an active device that includes or otherwise controls the active unit, to control the operation of the active unit. It will be appreciated that the terms state, current state and target state may be replaced by analogous terms and expressed in various ways, as long as retaining the essence of what is reported by smart devices to characterize their condition or situation or output, and what is to be autonomously calculated and then determine the operation of functional units of active devices.

A simple use example of states of smart devices is of a controllable connector unit that is an electronically-actuated smart light switch, whose states are defined by the vendor as 0 (off) and 1 (on); when the controller of the light switch calculates target state=1, the light switch will turn on and its controller will report to other smart devices that the current state of the light switch has become 1. A more complex exemplary case is where a vendor of a controllable service unit that is an electric gate defines states of the electric gates such as 0 (close), 1 (partly open, opening), 2 (open), 3 (partly open, closing), and 30, 31, . . . 120 which represent the number of seconds that the gate is instructed to stay fully open before automatically reclosing. Thus, if the controller of the electric gate calculates a target state=2, the gate will open while momentarily reporting a current state=1, and stay open reporting a current state=2 until otherwise instructed; alternatively, if the controller of the electric gate calculates a target state=60, the gate's reported current state will start with 0, change to 1 for the period of time needed for the gate to open, stay 2 for 60 seconds, change to 3 for the period of time needed for the gate to close, and change back to 0. In this example, the current state and target state may occupy different ranges of values, yet they are useful and unambiguous for effective programming and monitoring of the gate operation without confusion. Another exemplary, complex target state is of an active device that is a text messaging apparatus, whose target state actually includes two parameters: an address, such as '2125557890', and a message content, such as 'abracadabra'. This exemplary target state may be represented either by the two separate parameters: 2125557890 (numeric), and 'abracadabra' (text), or by a single text parameter such as '2125557890 (abracadabra)'. Another example of a complex state if of an air conditioner whose target state includes both 'low', 'med', 'high' airflow intensity and a numerical temperature parameter. The actual target state format is specified and published by the vendor of the smart device, and the person that programs the apparatus is required to adhere to the published format so that the respective active device will function as desired.

An active unit "cooperates" with another (active or information) functional unit if the active unit selectably changes its state in response to a change in the state of the other functional unit. The two cooperating functional units may reside on two separate smart devices, for example one smart device controlling an air conditioner while the other smart device including an ambient thermometer; or both may reside within a single smart device, as is the case, for example, of a smart device that includes both a light (active unit) and a motion sensor (information unit) that affects the operation of the light. Two smart devices are said to cooperate if they include functional units that cooperate.

It will be noted that cooperation may extend beyond two smart devices or functional units. For example, a light (active unit) may turn on when both darkness is detected by a light sensor (information unit) while motion is detected by a motion sensor (information unit); further, the same light (active unit) may turn on also upon an electric gate (active unit) opening while darkness is detected by the light sensor (information unit).

A "cluster" is a group of at least two smart devices, each cooperating with at least one other smart device of the cluster. A functional unit is said to belong to a cluster if it forms part of a smart device included in the cluster. A cluster selectably communicates with at least one "programming device" that is a computing device or system, such as a personal computer, a tablet or a smartphone, or any programming environment used by professional programmers, that can communicate with smart devices of the cluster for allowing programming the cooperation rules of a cluster and distributing them to smart devices of the cluster. In a "connected cluster" there is a path of undirected cooperation links between each two smart devices of the cluster, as explained with reference to FIG. 1A below.

A "cluster cooperation program" is a code or script determining, for all active devices of a cluster, how to calculate the target state of each active unit controlled by each active device according to current state(s) of functional unit(s) reported by other smart devices of the cluster. A "device cooperation program" is a code or script determining, for an active device of a cluster, how to calculate the target state(s) of the active units(s) controlled by the active device according to current state(s) of active unit(s) reported by other smart devices of the cluster.

In a cluster of smart devices that cooperates with a control hub, a "hub-based mode", or hub-managed mode, is where the control hub runs the cluster cooperation program to calculate the target states of active devices of the cluster and sends commands to active devices to perform in order to reach their respective calculated target state. Thus, in a hub-based mode the cooperation among devices of a cluster is managed by a control hub cooperating with the cluster. Optionally, such commands may explicitly include calculated target states. A "hub-less mode", or hub-free or autonomous mode, is where active devices receive current state reports from other devices of the cluster, each active device running its device cooperation program to calculate its target state according to the received current state reports and performs to reach it target state. A single cluster may concurrently operate in both hub-based mode for some of the active devices, and hub-less mode for other active devices.

A "spreadsheet" is used herein under two meanings: (1) data and formulas organized in a tabular form; and (2) an interactive computer program for organization, analysis and storage of data in tabular form. The program operates on data entered in cells of a table. Each cell may contain numeric data, logical data, text data or a formula, and display the data or the result of calculating the formula based on the contents of other cells. For brevity, "cell" herein may mean also to the content of a cell, as in the expression cell A7 equals cell B5 plus cell C6. A "spreadsheet formula" is a spreadsheet-recognizable formula contained within a cell of a spreadsheet, in a form that is a human-comprehensible textual expression that may include any combination of: numeric, logical and/or text values; references to other cells; arithmetic and/or relational operators; or functions.

The data and formulas of a spreadsheet are considered herein a valid script or code for programming a cluster; accordingly, a "cluster cooperation spreadsheet", abbreviated a "cluster spreadsheet", and a "device cooperation spreadsheet", abbreviated "device spreadsheet", are usable in embodiments that use spreadsheets as cluster cooperation programs and device cooperation programs, respectively. Such embodiments facilitate the manageability by users of simpler clusters of smart devices.

The present disclosure recites processors performing calculations and controlling operations. The term "processor" pertains herein to one or more microprocessors and/or circuits collectively programmed to perform an algorithm. The term "programmed to" or "programmed for" pertains herein to a processor configured to perform an algorithm by mask design, by executable code recorded in firmware embedded in or next to the processor, and/or by executable code or script loaded into the processor from a memory or another storage device.

The present disclosure focuses on the programming of functional cooperation among functional units of a cluster of smart devices and does not concern communication and pairing among smart devices, which may benefit from popular communications protocol used for interconnecting products in and beyond the smart homes, such as X10, Ethernet, RS-485, 6LoWPAN, Bluetooth LE (BLE), ZigBee and Z-Wave, with new protocols emerging from time to time.

In this disclosure and the attached claims, phrases such as 'comprising an item', 'including an item', 'having an item', and so forth, denote one or more of the cited item. Also, depending on the context, phrases using a plural language such as in 'the system includes widgets connected to gadgets' cover also the singular cases of a widget connected to a gadget, a widget connected to several gadgets, or several widgets connected to a gadget. The term "selectably", such as in selectably performing an action, means herein that an action is performed only as needed or upon user initiative or external command or signal.

In its broadest sense, the present invention teaches autonomous cooperation among smart devices of a connected cluster, where each active device of a connected cluster decides by itself and for itself how to respond to current states reported by other smart devices. A programming device is used for programming a cluster cooperation program that defines the cooperation rules for all active devices of the cluster and is optionally used for testing the cluster operation in a hub-based mode. A programming device is then used for deriving and distributing device cooperation programs derived from the cluster cooperation program to all active devices of the cluster, for autonomous operation of the active devices. In simpler clusters, for example in typical smart home applications, using a cluster spreadsheet as a cluster cooperation program and as a programming environment is advantageous for allowing many users and handymen that are not professional programmers, to program cooperation among smart devices according to personal needs and preferences of end users. It will be noted, however, that in larger and more complex clusters in the broader IoT context, such as in manufacturing or traffic control systems or autonomous cars, using a spreadsheet as a programming tool may prove too limiting and inadequate, and professional programmers using common professional programming environments may do the programming of the cluster cooperation program.

In the simpler clusters, where a spreadsheet is used as a cluster cooperation program and as a programming environment, spreadsheet formulas are used to calculate target states of active units according to reported current states of functional units. Programming messages based on the spreadsheet formulas are received and stored by the smart devices of the cluster for autonomous operation. Processors of smart devices of the cluster then receive reported current states of functional units of the cluster, calculate the target states of the active units included in the smart devices according to the received current states and respective spreadsheet formulas, and control the active units according to the calculated target states.

According to aspects of the present invention, there is provided a connected cluster of smart devices, the connected cluster programmed to cooperate according to a cluster cooperation program, the cluster cooperation program for calculating target states of active units according to current states of functional units, the connected cluster including: (1) at least one information device, each information device for reporting a current state of at least one information unit; and (2) at least two active devices, each active device for controlling at least one active unit, each active device including: (a) a communication unit included in the active device for: (i) receiving from a programming device a device cooperation program derived from the cluster cooperation program, and (ii) receiving from smart devices of the connected cluster current states of functional units, (b) a memory included in the active device for storing the device cooperation program derived from the cluster cooperation program and received via the communication unit, and (c) a processor included in the active device and programmed to autonomously: (i) calculate a target state of each active unit controlled by the active device according to the device cooperation program stored in the memory and at least one current state of a functional unit received via the communication unit, and (ii) control each active unit controlled by the active device for operating according to the calculated target state.

The cluster cooperation program may be in a format of a cluster spreadsheet, and the device cooperation program then includes at least one spreadsheet formula from the cluster spreadsheet. Additionally or alternatively, for at least one active device, the device cooperation program may equal the cluster cooperation program. In this case, the processor of the active device is aware of the identity(ies) of the active unit(s) included in or controlled by the active device, and controls those active unit(s) according to the respective target state calculations made according to the cluster cooperation program.

According to other aspects, there is provides an active device that forms part of a cluster of smart devices that cooperates with a control hub programmed to run a cluster cooperation program. The active device includes: an active unit for controllably performing an action; a memory storing a device cooperation program derived from the cluster cooperation program; and a processor programmed to selectably operate in a hub-based mode or in a hub-less mode, wherein: in the hub-based mode the processor operating to: (i) receive from the control hub commands for operating the active unit, and (ii) control the active unit to perform the action according to the received commands; and in the hub-less mode the processor operating to: (i) receive from one or more smart devices of the cluster current states of functional units included in the smart devices, (ii) run the device cooperation program to calculate a target state for the active unit according to the received current states, and (iii) control the active unit to perform the action for reaching the calculated target state.

The device cooperation program may be essentially the same as the cluster cooperation program, which means that the device cooperation program and the cluster cooperation program produce the same target states when receiving the same current state reports.

The control hub may be a programming device operating as a temporary control hub for testing the cluster. Alternatively, a control hub may operate regularly to control a cluster in a hub-based mode, and, as a fallback provision, the processor of an active device is further programmed to decide whether to operate in a hub-based mode or in a hub-less mode by: (i) operating in the hub-based mode upon successful communication with the control hub; and (ii) automatically switching to the hub-less mode upon failing to communicate with the control hub. The processor of the active device may be further programmed, while operating in the hub-less mode, to switch to the hub-based mode upon recommunicating with a control hub. Also, the processor may be further programmed to switch to the hub-less mode upon communicating with the control hub and detecting malfunction of the control hub, for example, where commands received from the control hub are improper in any predefined security or functional aspect. Also, the processor may be further programmed to switch to the hub-less mode upon communicating with the control hub and receiving from the control hub an instruction to switch to the hub-less mode.

The active unit included in the active device may be, for example, a controllable service unit whose action is providing a tangible useful service, such as lighting, or a controllable connector unit whose action is supplying a resource that is consumed by provision of a tangible useful service by an external active device, such as an electronically-actuated switch providing electricity, or an electronically-actuated valve providing water.

Also provided is a method of operating a processor of an active device, the active device forming part of a cluster of smart devices, the cluster cooperating with a control hub programmed to run a cluster cooperation program, the active device including an active unit for controllably performing an action and a memory storing a device cooperation program derived from the cluster cooperation program. The method includes: deciding whether to operate in a hub-based mode or in a hub-less mode; in the hub-based mode: (i) receiving from a control hub commands for operating the active unit, and (ii) controlling the active unit to perform the action according to the received commands; and, in the hub-less mode: (i) receiving from one or more smart devices of the cluster current states of functional units included in the smart devices, (ii) running the device cooperation program to calculate a target state for the active unit according to the received current states, and (iii) controlling the active unit to perform the action for reaching the calculated target state.

The device cooperation program may be essentially the same as the cluster cooperation program of the cluster of smart devices. Deciding whether to operate in a hub-based mode or in a hub-less mode may be based on: selecting to operate in the hub-based mode upon successful communication with the control hub; and selecting to operate in the hub-based mode upon failing to communicate with the control hub. While operating in the hub-less mode, the method me decide to switch to the hub-based mode upon recommunicating with a control hub. Also, while operating in the hub-based mode, the method may decide to switch to the hub-less mode upon communicating with the control hub and detecting malfunction of the control hub, or receiving from the control hub an instruction to switch to the hub-less mode.

In some embodiments, an active device of the at least two active devices may be: (i) a service device that includes a controllable service unit providing a tangible useful service; (ii) a connector device that includes a controllable connector unit affecting the supply of a resource that is consumed by an external active device that provides a tangible useful service; or (iii) an active bridge device controlling an external active device that provides a tangible useful service. It will be noted that in options (i)-(ii) above, the controllable service unit/controllable connector unit, respectively, is contained in a common enclosure with and/or is physically attached to the respective communication unit, memory and processor of the same active device.

According other aspects of the present invention, there is provided a method of operating a connected cluster of smart devices to cooperate according to a cluster cooperation program, the cluster cooperation program for calculating target states of active units according to current states of functional units, the method including: (1) in each information device of the connected cluster: reporting a current state of at least one information unit; and (2) in each active device of at least two active devices of the connected cluster: controlling each active unit of at least one active unit controlled by the active device, by: (a) receiving from a programming device a device cooperation program derived from the cluster cooperation program, (b) storing the device cooperation program derived from the cluster cooperation program and received via the communication unit, in a memory of the active device, (c) receiving from smart devices of the connected cluster current states of functional units, (d) autonomously calculating a target state of each active unit controlled by the active device according to the device cooperation program stored in the memory and at least one received current state of a functional unit, and (e) controlling each active unit for operating according to the calculated target state.

The method may further include the step of: in a programming device: testing the connected cluster in hub-based mode, by running the cluster cooperation program for: (i) receiving from smart devices of the connected cluster current states of functional units, (ii) calculating, by the programming device, a target state for each active unit controlled by each active device of the connected cluster, according to the cluster cooperation program and the received current states of functional units, and (iii) controlling the active devices for operating according to the calculated target states. The method may also include the step of: in a programming device: deriving and distributing the device cooperation program to each active device of the connected cluster.

The cluster cooperation program may be a cluster spreadsheet, and the device cooperation program then includes at least one spreadsheet formula from the cluster spreadsheet. In some embodiments, the device cooperation program of at least one active device may equal the cluster cooperation program.

According to further aspects of the present invention, there is provided an active device for selectably cooperating with smart devices, the active device including: (1) an active unit included in the active device for controllably performing an action; (2) a communication unit included in the active device for: (a) receiving spreadsheet formulas from programming devices, and (b) receiving from smart devices current states of functional units; (3) a memory included in the active device for storing spreadsheet formulas received via the communication unit; and (4) a processor included in the active device and programmed to autonomously: (a) calculate a target state of the active unit included in the active device according to: (i) one or more of the spreadsheet formulas received via the communication unit and stored in the memory, and (ii) one or more of current states of a functional units received via the communication unit, and (b) control the active unit included in the active device for performing the action according to the calculated target state.

An active unit included in the active device may be a controllable service unit whose action is providing a tangible useful service, such as lighting. An active unit included in the active device may be a controllable connector unit whose action is supplying a resource that is consumed by provision of a tangible useful service by an external active device. In an exemplary embodiment, the controllable connector unit may be an electronically-actuated switch and the resource be electricity; in another exemplary embodiment, the controllable connector unit may be an electronically-actuated valve and the resource be water.

In an exemplary embodiment, the spreadsheet formulas may be in a format of a complete spreadsheet and the target state is calculated by the processor of the active device interpreting a spreadsheet. In another exemplary embodiment, the spreadsheet formulas are in a format of a spreadsheet, and the processor and the communication unit of the active device are further operable to provide to programming devices a spreadsheet stored in the memory for restoring a cluster of smart devices.

The active device may include a real-time clock, and one or more spreadsheet formulas used to calculate a target state may includes a time parameter.

When a cluster spreadsheet is used for calculating target states, the cluster spreadsheet and the memory of an active device may include one or more formulas for intermediate calculation(s).

BRIEF DESCRIPTION OF THE DRAWINGS

The present invention will be understood and appreciated more fully from the following detailed description, taken in conjunction with the drawings in which:

FIG. 2A is a simplified block diagram describing a programming device.

FIG. 2B is a simplified block diagram describing operation modes of a programming device.

FIGS. 2C-2D categorize functional units and smart devices, respectively.

FIGS. 3A-3H and 3J are example spreadsheets demonstrating different contents and formats of cluster spreadsheets and device spreadsheets. "FIG. 3I" has been skipped to avoid confusion with "FIG. 3l".

FIG. 7 is a block diagram schematically categorizing programmable information units.

FIGS. 8A-8C are exemplary spreadsheets demonstrating a virtual information unit.

FIGS. 9A-9B are exemplary spreadsheets demonstrating a user-made information unit.

FIG. 14 is a block diagram schematically summarizing two operation modes of a cluster.

FIG. 15 is a block diagram schematically summarizing the concept of device cooperation program derived from cluster cooperation program.

FIG. 16 is a flowchart describing the process of establishing, testing and operating an autonomous cluster.

DETAILED DESCRIPTION

Hub-Based Vs. Autonomous Clusters

Figure 10:
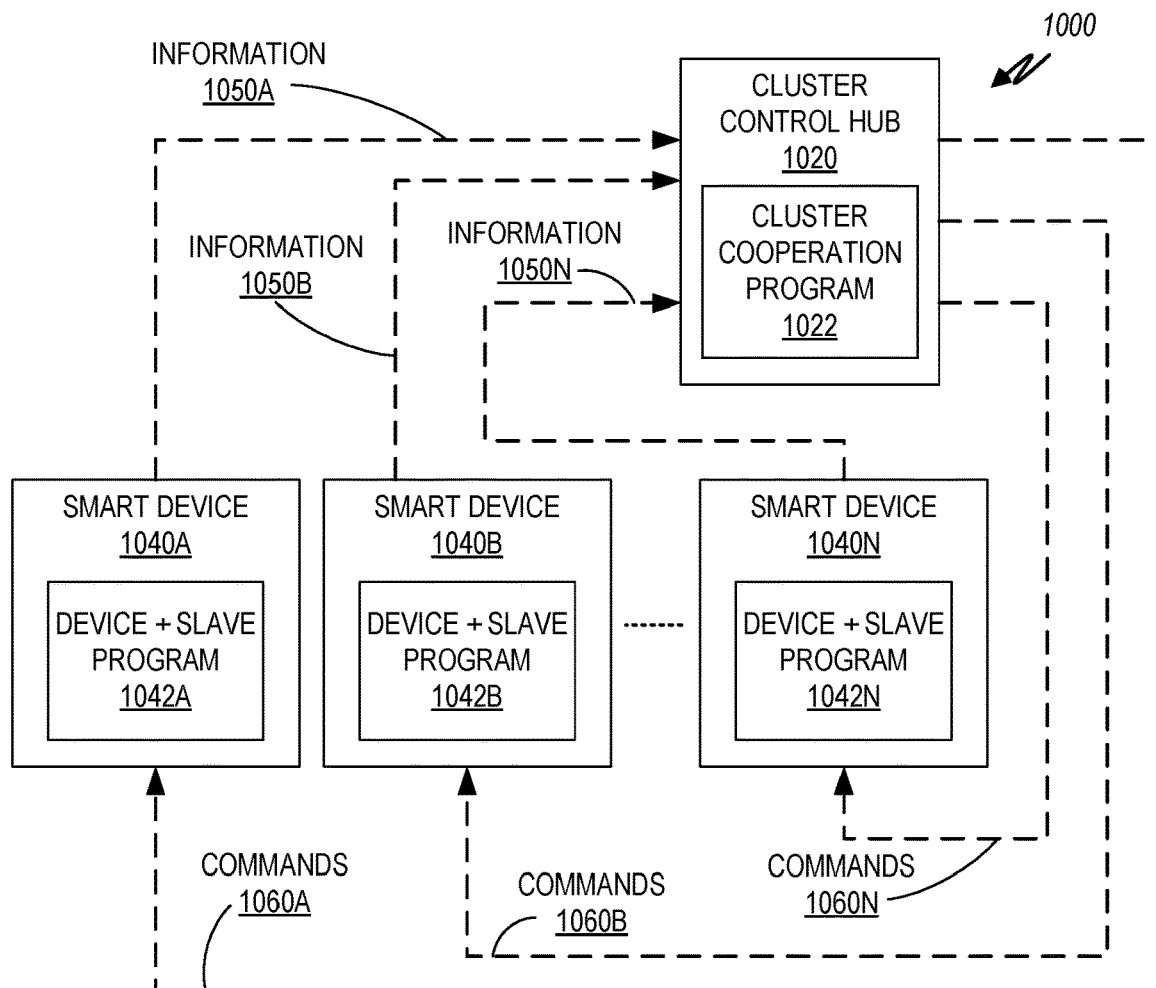
FIG. 10 is a block diagram demonstrating a hub-based system of the background art.

FIG. 10 (background art) depicts a hub-based system 1000 of the background art. Smart devices 1040A . . . 1040N are deployed, each operating according to its respective device+ slave program 1042N . . . 1042N. The device part of device+ slave program takes care of the device operation, such as the operation of a computerized machine, while the slave feature of device+ slave programs of active devices of smart devices 1040A . . . 1040N is for obeying commands received from cluster control hub 1020 running cluster cooperation program 1022 to selectably affect the operation of the active devices. The information devices of the smart devices 1040A . . . 1040N of system 1000, such as sensors, detectors, user-interface devices, remote controls or Internet data fetchers are programmed to acquire and report information to cluster control hub 1020, while the active devices of the smart devices 1040A . . . 1040N of system 1000 are programmed to control the operation of respective active units included in or controlled through or by controllers of the active devices according to commands 1060A . . . 1060N received from cluster control hub 1020. Thus, information 1050A . . . 1050N is sent by smart devices that are information devices and is optional for smart devices that are active devices, while commands 1060A . . . 1060N affect the operation of active devices. The cooperation among smart devices of hub-based system 1000, i.e. the rules determining how each active device responds to current state changes reported by other smart devices of the cluster, is exclusively determined by cluster cooperation program 1022 running on a processor of cluster control hub 1020.

Figure 11:
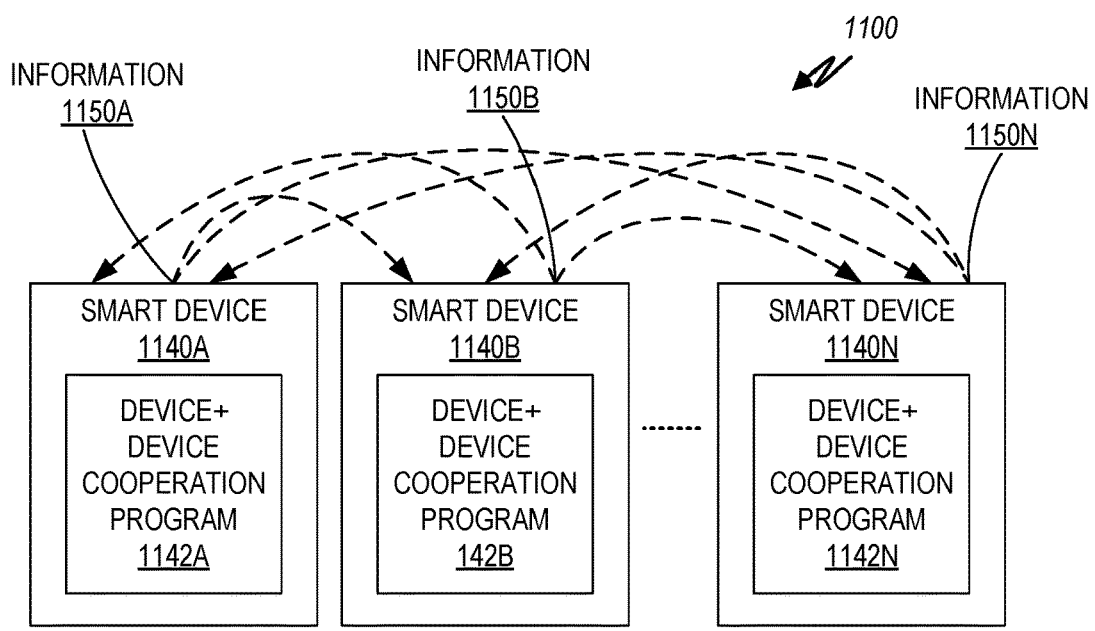
FIG. 11 is a block diagram demonstrating a hub-less autonomous cluster.

FIG. 11 depicts an autonomous cluster 1100, that includes smart devices 1140A . . . 1140N that autonomously cooperate, independent of a hub. Thus, while current state information 1150A . . . 1150N is reported by all information device and optionally also by active devices of smart devices 1140A . . . 1140N, no commands equivalent to commands 1060A . . . 1060N of hub-based system 1000 of FIG. 10 are shown in FIG. 11; instead, each active device of smart devices 1140A . . . 1140N runs its own respective device cooperation program 1142A . . . 1142N that calculates the target state of respective functional unit(s) according to the current state(s) reported by other smart devices of autonomous cluster 1100. Examples of target states calculations according to reported current states are described below with reference to spreadsheet-based cooperation programs, for example with reference to FIG. 3D.

It will be noted that in actual embodiments, some of the dotted lines representing information flow in FIGS. 10 and 11 and commands flow in FIG. 10 are inactive and effectively omitted per case, and are included in FIGS. 10 and 11 for clarity and brevity of the description. Removing inactive dotted lines is required when identifying connected clusters according to actual cooperation links 104L, as demonstrated in FIG. 1A and the related description.

Figure 12:
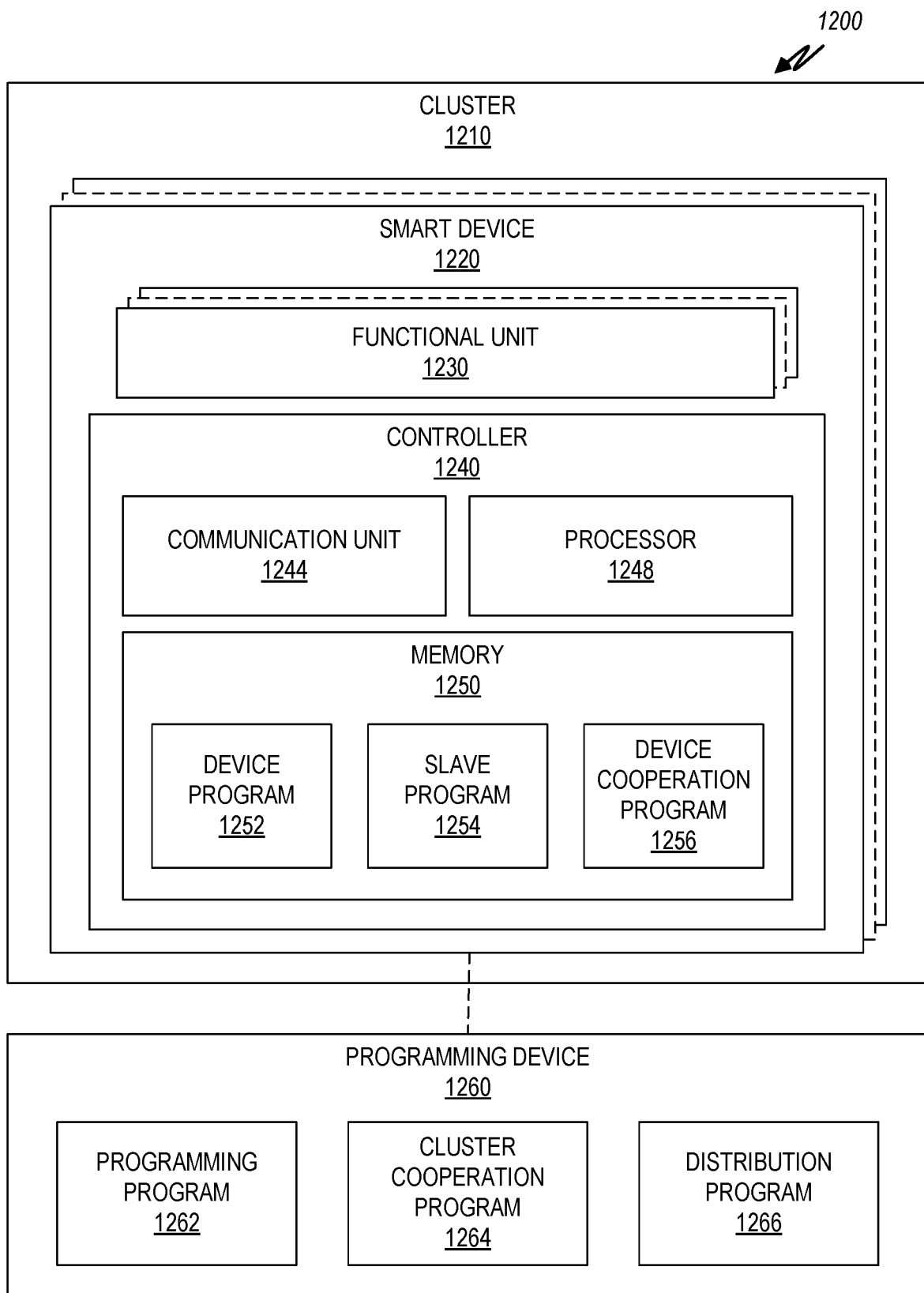
FIG. 12 is a block diagram demonstrating a system that includes a hub-less autonomous cluster and programming device.

FIG. 12 depicts system 1200 that includes the layout of autonomous cluster 1100 of FIG. 11, with the addition of a programming device 1260. Cluster 1210 includes a plurality of smart devices 1220 each including zero or more functional unit 1230 and a controller 1240. Controller 1240 includes communication unit 1244 for receiving programming instructions from a programming device 1260, and for sending and/or receiving current state reports to and/or from other smart devices of the cluster. Memory 1250 includes a device program 1252 that runs on processor 1248 to control the operation of communication unit 1244 and functional unit(s) 1230 included in or controlled by smart device 1220. Device cooperation program 1256 is included in a smart device 1220 that is an active device to calculate that target state of functional unit(s) 1230 that are active units, according to current state(s) reported by other smart device(s) of cluster 1210, and possibly also according to time parameters. Slave program 1254 may be included for running on processor 1248 in a hub-based test mode, under the control of a programming device 1260 acting as a temporary control hub running cluster cooperation program 1264.

It will be noted that device program 1252 is preferably programmed and provided by the vendor of smart device 1220 as part of the smart device, to control and manage actions of the included functional unit(s) 1230; in sophisticated smart devices, such as industrial robots, medical diagnosis devices or drones, the device program 1252 may be complex and require substantial computing resources. On the other hand, device cooperation program 1256 is programmed by programmers or users of cluster 1210 that use a programming device 1260 for determining cooperation rules among the smart devices 1220 of cluster 1210, typically requiring only minimal or modest computing resources. Accordingly, it will be appreciated that in practical implementation of system 1200, the addition of device cooperation program 1256 to memory 1250 may require only marginal extra storage and processing resources that require no extra hardware, which implies that the autonomous cluster 1100 (FIG. 11) is less expensive than hub-based system 1000 (FIG. 10) by eliminating the cost of cluster control hub 1020, as well as more reliable because of eliminating the cluster control hub 1020 as a single point of failure. Device program 1252 is responsive to device cooperation program 1256 and optionally also to slave program 1254, to selectably affect the operation of active unit(s) 1230 of smart device(s) 1220 that are active devices, in response to current state changes reported by smart device(s) of cluster 1210.

Programming device 1260 is a computing device, such as a personal computer, tablet computer or smartphone, or any programming environment, including hardware and software, used by professional programmers. Programming device 1260 is used for programming and preferably testing cluster 1210. Programming program 1262 uses a programming environment, such as C or a spreadsheet, usable for coding or scripting a cluster cooperation program 1264 that calculates, for each active device of cluster 1210, target state(s) of active unit(s) of the active device according to current state(s) of functional unit(s) reported by smart devices of cluster 1210. Cluster cooperation program 1264 is used for two purposes: (i) for optionally running on programming device 1260 that acts as a temporary hub in hub-based test mode, where individual smart devices 1220 run their slave program 1254 in order to cooperate according to commands generated by and received from programming device 1260, similar to hub-based system 1000 of FIG. 10; and (ii) as a basis for deriving cooperation programs 1256 for all active smart devices 1220 of cluster 1210. Distribution program 1266 receives cluster cooperation program 1264 as its input, and derives and distributes device cooperation programs 1256 to all active devices of cluster 1210.

Figure 13:
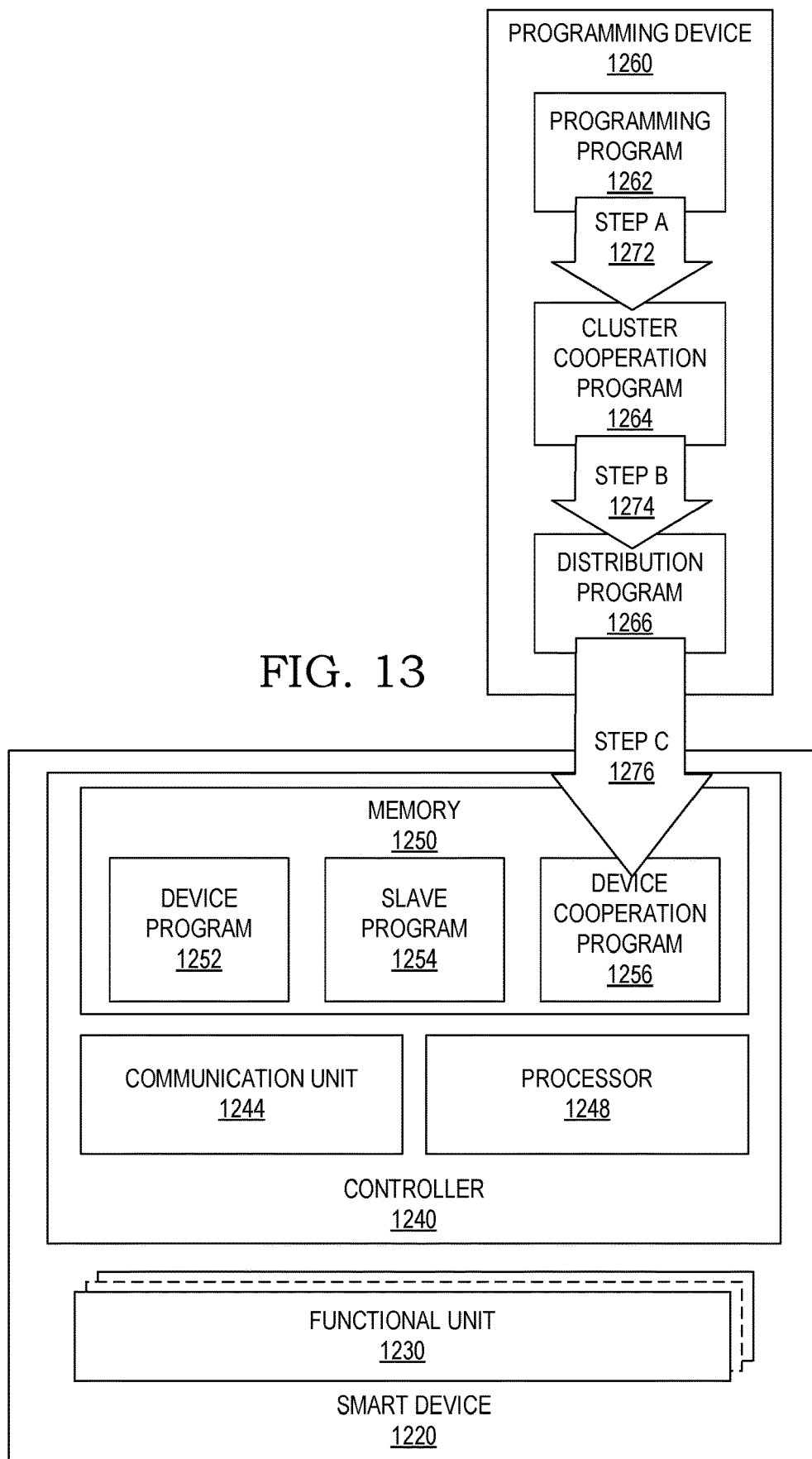
FIG. 13 is a flowchart schematically illustrating the process of programming a hub-less autonomous cluster by a programming device.

FIG. 13 schematically illustrates and summarizes three steps A-C of programming an active device 1220 of cluster 1210 of FIG. 12 by programming device 1260. In step A 1272, programmers or users use programming program 1262 that uses a programming environment usable for coding or scripting a cluster cooperation program 1264 that determines, for each active device of cluster 1210, how to calculate target state(s) of active unit(s) controlled by the active device according to current states of active unit(s) reported by smart devices of cluster 1210. In step B 1274, the code or script of cluster cooperation program 1264 is handed over to a programming device 1260 that runs distribution program 1266, to derive and then distribute in step C 1276, device cooperation programs 1256 to active devices 1220 of FIG. 12.

FIG. 14 illustrates and summarizes two operation modes 1400 of a cluster: hub-based mode 1410 and autonomous devices mode 1420, also called herein hub-less mode. With reference also to FIGS. 10-12, hub-based mode 1410 is optionally used for testing cluster cooperation program 1264 and the smart devices 1220 of cluster 1210; cluster 1210 runs in a hub-based mode, similar to hub-based system 1000 of the background art, where programming device 1260 running cluster cooperation program 1264 and acting as a control hub, sends commands to control active devices of smart devices 1220 that run in slave mode under slave program 1254. In autonomous devices/hub-less mode 1420, programming device 1260 may be disconnected from cluster 1210, and each active device of smart devices 1220 operates under its device cooperation program 1256, to operate autonomously according to the hub-less configuration of FIG. 11.

FIG. 15 illustrates and summarizes the concept 1500 of device cooperation program derived from the cluster cooperation program, with the specific case 1504 of device cooperation program being essentially the same as the cluster cooperation program, and the specific case 1510 of device cooperation program being equal to the cluster cooperation program. According to concept 1500, the device cooperation program running on a processor of a smart device, is derived from the cluster cooperation program running on a control hub or on a programming device operating as a temporary control hub, so that both the device cooperation program and the cluster cooperation program will produce, from the same current states reported by other pertinent devices of the cluster, the same target states related to the smart device. According to case 1504, the symbol "≈" means "essentially the same", where the device cooperation program is capable of calculating all target states of all active devices of the cluster yet may differ from the cluster cooperation program in some technical aspects, for example due to different processing environments. According to case 1510, the cluster cooperation program 1264 is copied to the active devices of smart devices 1220 of cluster 1210, acting as a device cooperation program 1256 of each active device. Case 1510 of device cooperation program equals the cluster cooperation program is the simplest, straightforward mode of operation of distribution program 1266 for deriving device cooperation program 1256 of an active device 1220 from cluster cooperation program 1264 by step C 1276 of FIG. 13. Thus, under case 1510, all active devices of the cluster may run the same cluster cooperation program 1264, yet each active device is aware of its own identity, and accordingly its processor affects the operation only of active unit(s) included in or controlled by the active device according to target states calculated by its processor running cluster cooperation program 1264. Case 1504 of the device cooperation program being essentially the same as the cluster cooperation program, may be also relatively easy to implement, as it may just require one time adaptation of the cluster cooperation program according to the computing environment of the smart devices, and then the adapted program may be copied to all active devices. If, however, a controller 1240 of an active device of cluster 1210 is incapable of running cluster cooperation program 1264 because of limited or incompatible resources, then, according to concept 1500, device cooperation program 1256 may be derived from the cluster cooperation program 1264 by programming device 1260 running distribution program 1266, by trimming from cluster cooperation program 1264 program modules that are unrelated to the respective active device and/or translating and adapting the program code or script as needed for running on the controller of the respective active device.

It will be appreciated that running a complete cluster cooperation program (option 1510) on the controllers of individual autonomous active devices becomes more and more attractive and feasible as processors are becoming more powerful and affordable and programming environments becoming more versatile and standard. This option simplifies the distribution program 1266 and allows retrieval of a cluster cooperation program from active devices, for example for restoring a cluster.

FIG. 16 is a flowchart describing the process of establishing, testing and operating an autonomous cluster 1100 of FIG. 11 and cluster 1210 of FIG. 12. In step 1601 a cluster cooperation program is authored by programmers or users, using a programming device 1260 of FIG. 12. In step 1605 the smart devices are deployed in their intended site or locations, and communication among the smart devices is established and tested, using communication networks known in the art. Advantageously, in optional step 1609, the cluster operates in hub-based mode, by programming device 1260 (FIG. 12) acting as a temporary hub running cluster cooperation program 1264, while the controllers 1240 of active devices of cluster 1210 are running their slave program 1254 to obey commands received from the temporary hub, thereby operating in hub-based mode, similar to the background art described in FIG. 10, which allows testing both the cluster cooperation program 1264 and the functioning of the smart devices of cluster 1210, followed by appropriate updates and fixes to cluster cooperation program 1264 and participating devices as needed. In step 1613 the device cooperation programs 1256 of all active devices of cluster 1210 are derived from cluster cooperation program 1264 and are distributed by programming device 1260 running distribution program 1266 (steps B-C of FIG. 13) so that the memory 1250 of each active device of the cluster stores a device cooperation program 1256 that is either a copy of cluster cooperation program 1264 or derived from cluster cooperation program 1264 (see FIG. 15). In step 1617, the programming device 1260 may be disconnected from cluster 1210 (FIG. 12) and the active devices of cluster 1210 continue autonomous operation in hub-less mode, each device running its respective device cooperation program, as demonstrated by autonomous cluster 1100 of FIG. 11.

It will be noted that in simpler clusters, for example in typical smart home applications, using a cluster spreadsheet as a cluster cooperation program is advantageous by allowing many users and handymen that are not professional programmers, to effectively program cooperation among smart devices according to personal needs and preferences. It will be also noted, however, that in larger and more complex clusters in the broader IoT context, such as in manufacturing or traffic control systems, using a spreadsheet as a programming tool may prove too limiting and inadequate, and professional programmers using professional programming environment may be called to program the cluster cooperation program conventionally, and then the device cooperation programs for all active devices of the cluster are derived and distributed as taught above.

It will be appreciated that autonomous hub-less cluster 1100, compared to the hub-based system 1000 of the background art, eliminates the cost of the hub as well as the hub being a single point of failure.

Hub-Less Mode as a Fallback Provision for Hub-Based Mode

In some cases, for example in larger clusters that are under human supervision, such as a lighting system in a city, a hub-based mode of operation, as demonstrated in FIG. 10 (background art), may be the preferred choice. However, even in such cases, a cluster running in a hub-based mode or parts thereof may preferably be prepared for running in hub-less mode as a fallback provision. If connection with the control hub is lost, or the control hub malfunctions, or there is a natural disaster or a cyber attack, pieces of the cluster may continue functioning properly in a hub-less mode, until the cluster is recovered or repaired. Such approach is especially useful in cases where active devices are mostly responsive to current states of nearby sensors, such as in lighting, air-conditioning or safety systems.

Figure 17:
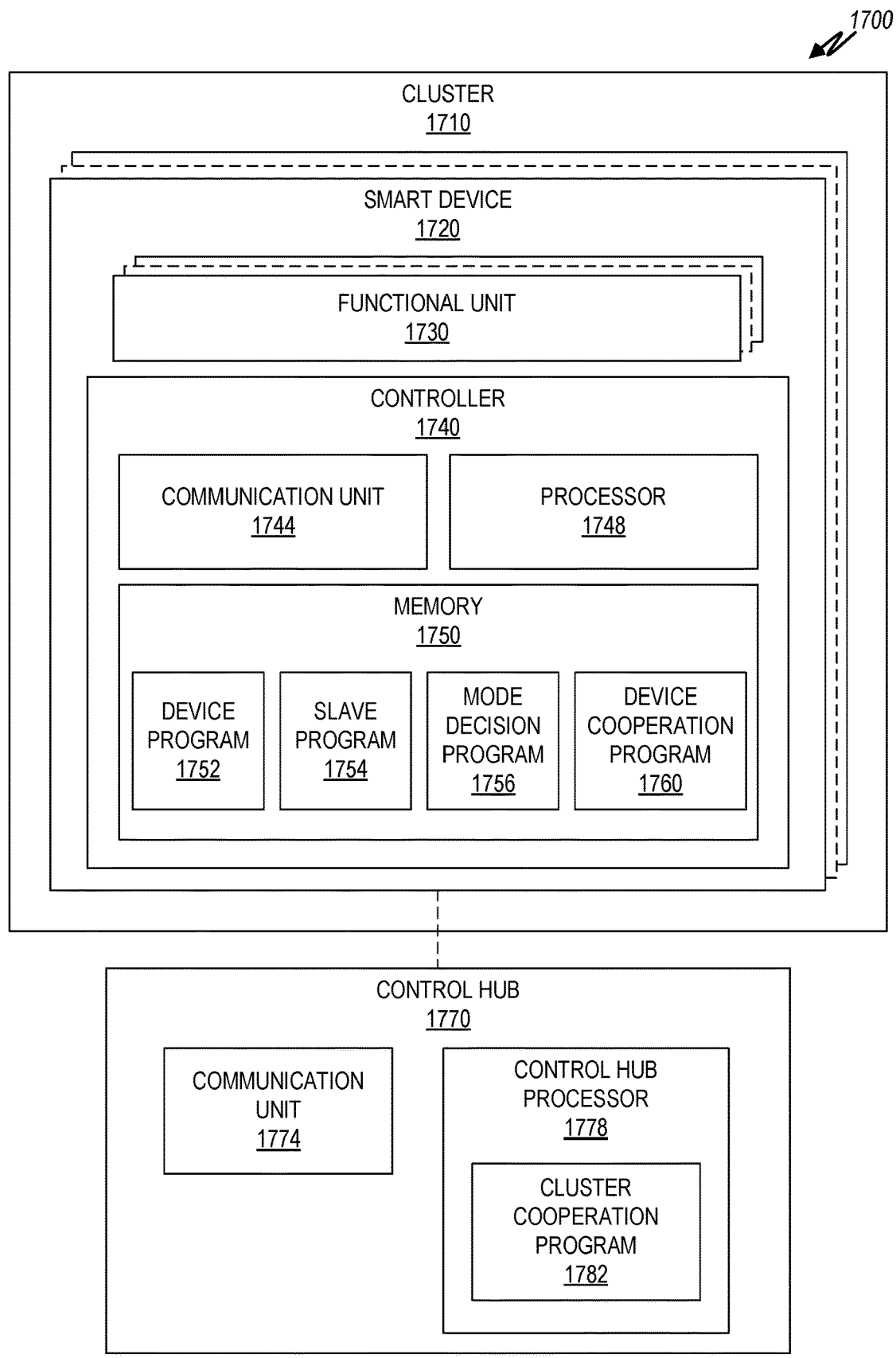
FIG. 17 is a block diagram schematically describing a cluster of smart devices connected to a control hub.

FIG. 17 depicts a system 1700 that includes a cluster 1710 of smart devices, each smart device 1720 including at least one functional unit 1730 and a controller 1740. Controller 1740 includes communication unit 1744, processor 1748 and memory 1750. Memory 1750 includes device program 1752, slave program 1754, mode decision program 1756 and device cooperation program 1760, all programs for running on processor 1748. All elements of cluster 1710 are similar in their function and operation to their counterparts in cluster 1210 of FIG. 12, except mode decision program 1756 that will be described below with reference to FIG. 18. Control hub 1770 includes control hub processor 1778 that runs cluster cooperation program 1782 for controlling cluster 1710 in hub-based mode, a communication unit 1774 for communicating with the smart devices of cluster 1710, and possibly also with the cloud and external monitoring and control devices (not shown).

System 1700 also a programming device (not shown), similar to programming device 1260 of FIG. 12, that is used for programming and distributing both device cooperation programs 1760 of all smart devices 1720, as well as cluster cooperation program 1782 of control hub 1770.

Figure 18:
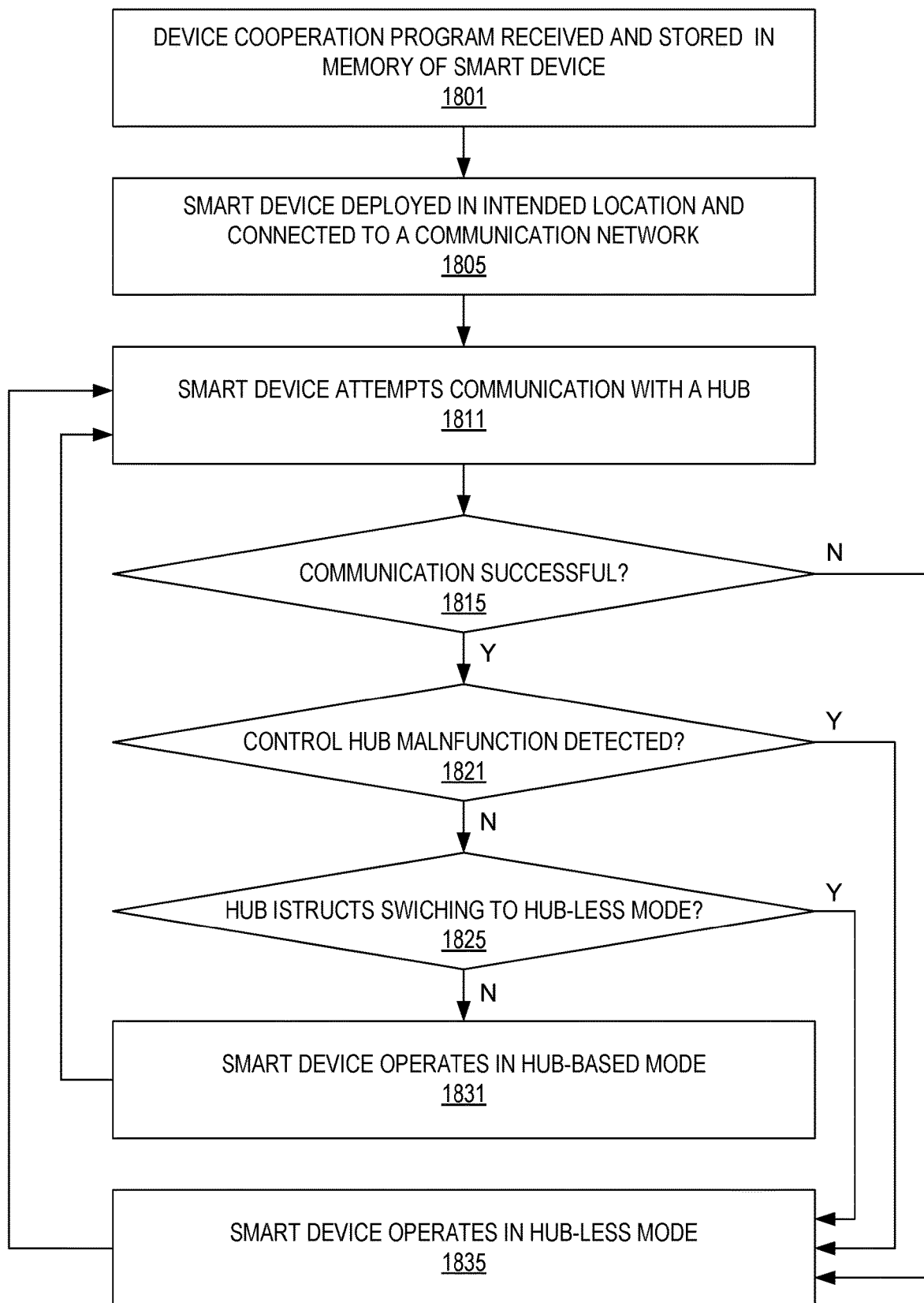
FIG. 18 is a flowchart describing the process of switching between hub-based mode and hub-less mode within a cluster of smart devices.

FIG. 18 described the operation of an active smart device 1720 that is programmed for switching to a hub-less mode of operation as a fallback provision under conditions defined by mode decision program 1756 as described in steps 1811-1835 below. Thus, in step 1801 an active smart device 1720 receives and stores in its memory its respective device cooperation program, that has been derived from the cluster cooperation program run by control hub 1770. In step 1805 the active smart device is deployed in its intended location and is connected to a communication network so that it can communicated with control hub 1770 and with other smart devices of cluster 1710. In step 1811 the active smart device 1720 attempts to communicate with control hub 1770. If in step 1815 the active smart device 1720 is detected by mode decision program 1756 as failing to successfully communicate with control hub 1770, and therefore the active smart device 1720 automatically switches to step 1835 of a hub-less mode, where processor 1748 receives from other smart devices of cluster 1710 current states of functional units included in the smart devices, runs device cooperation program 1760 to calculate a target state for each active functional unit 1730 included in active smart device 1720 according to the received current states, and controls each active unit to perform an action for reaching its calculated target state.

If step 1815 identifies that communication between active smart device 1720 and control hub 1770 is successful, then optional step 1821 checks whether control hub 1770 malfunctions according to predefined criteria, for example, if unclear commands are received, or commands are not properly signed by security keys, and, in case of control hub malfunction, active smart device 1720 switches to step 1835 of hub-less mode. Also optionally, in step 1825 the control hub may instruct the active smart device 1720 to switch to hub-less mode, for example to reduce the control hub workload, in which case active smart device 1720 also switches to step 1835 of hub-less mode. If none of steps 1815-1825 has switched active smart device 1720 to hub-less mode, then in step 1831 active smart device 1720 operates in hub-based mode, where slave program 1754 operates active smart device 1720 to run according to commands received from control hub 1770.

Preferably, from either operating in the hub-less mode of step 1835 or in the hub-based mode of step 1831, mode decision program 1756 moves back to step 1811, to iteratively check the conditions of steps 1815-1825 for reconsideration of the operation mode of active smart device 1720. For example, if communication failure in step 1815 causes switching to hub-less mode in step 1835, then moving back to step 1811 may cause reverting to hub-based mode in step 1831 upon detecting recommunication in step 1815.

It will be noted that according to design considerations, a hub-less mode as a fallback provision may be implemented in selected smart devices, while not implemented in other smart devices which will stop operation altogether when a hub is unreachable or malfunctions.

Figure 19A:
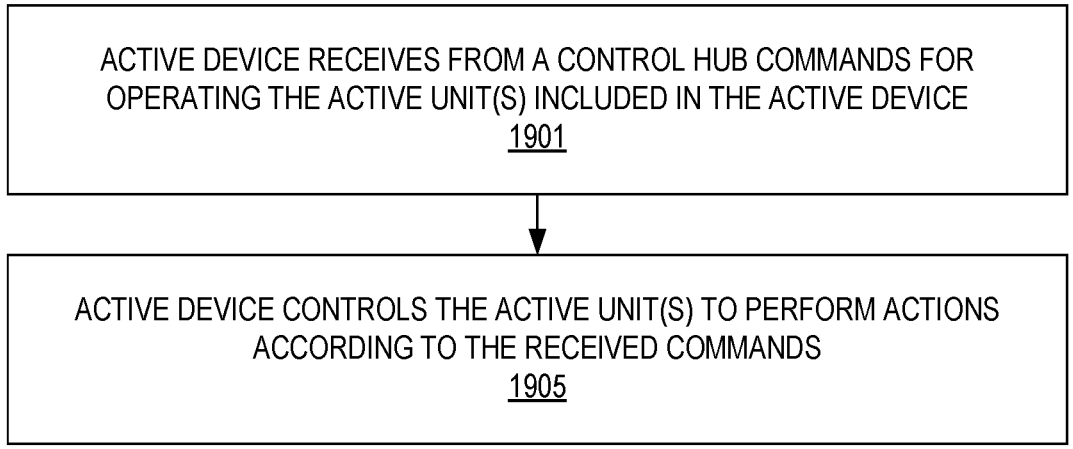
FIG. 19A is a flowchart describing the operation of an active device in a hub-based mode.

FIG. 19A further describes the hub-based mode of step 1831 of FIG. 18. In step 1901 the active device receives from a control hub commands for operating the one or more active unit(s) included in the active device. In step 1905 the active device controls active unit(s) included in the active device to perform actions according to the commands received from the hub.

Figure 19B:
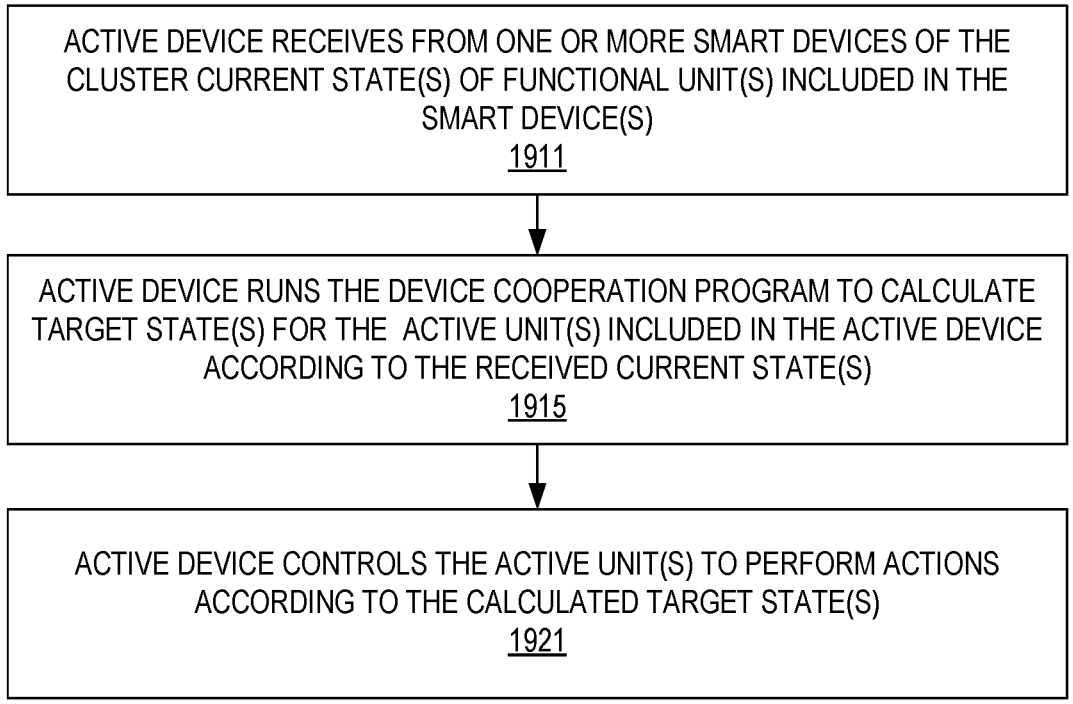
FIG. 19B is a flowchart describing the operation of an active device in a hub-based mode.

FIG. 19B further describes the hub-less mode of step 1835 of FIG. 18. In step 1911 the active device receives from one or more smart devices of the cluster current state(s) of functional unit(s) included in the smart devices. In step 1915 the active device runs the device cooperation program stored in its memory to calculate target state(s) for the active unit(s) included in the active device according to the received current state(s). In step 1921 the active device controls the active unit(s) to perform actions according to the calculated target state(s).

Using Spreadsheets for Programming Autonomous Clusters

According to a second optional aspect, the present disclosure teaches improving manageability by users of clusters of smart devices by using spreadsheets for programming the cooperation among smart devices, so that many users that are not professional programmers can set up smart devices to cooperate according to the users' requirements and preferences. In such cases, the cluster cooperation program is implemented as a cluster spreadsheet, and the device cooperation programs are implemented as device spreadsheets that equal or are derived from the cluster spreadsheet.

FIGS. 1A-9B and their respective descriptions below, elaborate on using spreadsheets for programming clusters, serving for both demonstrating the general concept of autonomous clusters described above with reference to FIGS. 11-16, as well as introducing spreadsheet-related features that offer specific advantages elaborated below. Some of the discussion below overlaps issues and features already introduced above, to emphasize elements that are elaborated in the spreadsheet context, yet may pertain to and demonstrate the general concepts of autonomous cluster, cluster cooperation program and device cooperation program introduced above.

Cluster, Smart Devices and Functional Units

Figure 1A:
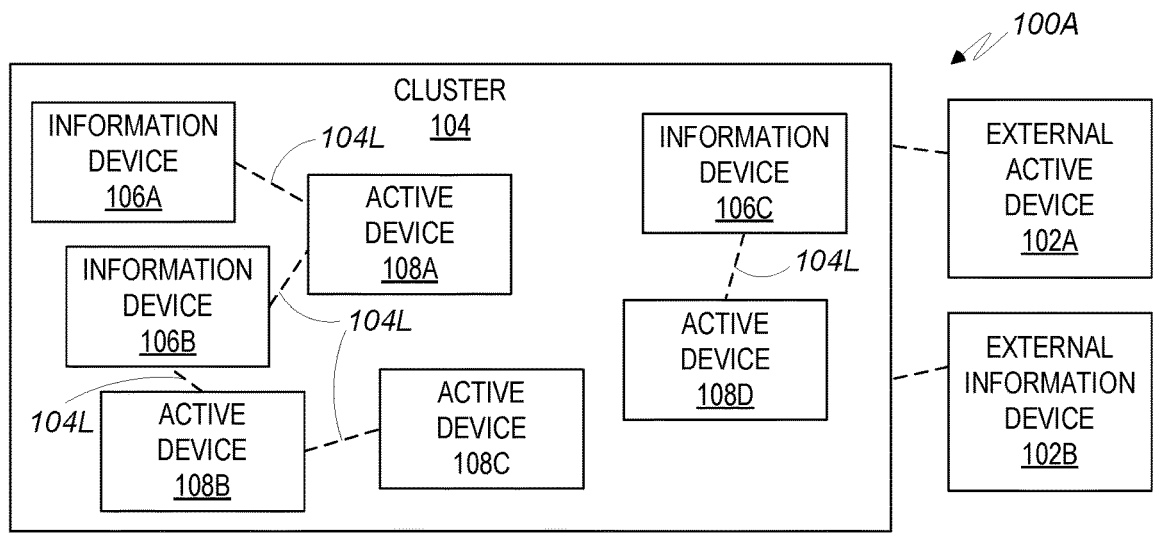
FIGS. 1A-1B are simplified block diagrams describing a cluster and a system including a cluster.

Reference is made to FIG. 1A that schematically describes a system 100A that includes a cluster 104 of smart devices, and optionally external devices 102A-102B. A cluster is established and programmed by a user and may later be updated by revised programming and/or by adding, deleting or replacing smart devices. Exemplary cluster 104 includes seven smart devices, out of which devices 106A-106C are information devices, and devices 108A-108D are active devices. Information devices provide to other devices information that may affect the operation of active devices, while active devices perform useful actions that serve a user or affect the provision of a service by external devices. Preferably but not necessarily, smart devices include real-time clocks that may further affect their operation. In the example of FIG. 1A, information device 106A such as a hygrometer, and information device 106B such as an ambient thermometer, affect the operation of active device 108A such as an air conditioner in the living room. The room temperature measured by information device 106B also affects the operation of active device 108B such as electric shades, which in turn affects the operation of active device 108C such as the living room lights. Information device 106C, such as a motion sensor in the kitchen, affects the operation of active device 108D, such as the kitchen lights. It will be appreciated that the pair information device 106C and active device 108D could be separated into a separate cluster, but, at the user option, they may be included in cluster 104. It will be also noted that the cooperation links 104L among smart devices in cluster 104 of FIG. 1A pertain only to the cooperation among the devices. There are other layers of connections, that pertain to network communication, pairing, energy supply and management, and security, that are covered by the art of smart homes and IoT and are out of the scope of the present disclosure and are not shown in the figures, Generally speaking, preferably but not necessarily, all smart devices of a cluster selectably or regularly communicate with one another, which facilitates reprogramming the cluster, or establishing new cooperations among currently-unrelated smart devices of the cluster.

A connected cluster is herein a cluster in which each two smart devices of the cluster have a path of cooperation links 104L connecting them, while ignoring directions of the cooperation links. Thus, cluster 104 includes two connected clusters: one composed of devices 106A, 108A, 106B, 108B and 108C, and the other composed of devices 106C and 108D. The advantage of having a larger cluster that includes multiple connected clusters that share the same communication networks and the same cluster spreadsheet (see below) is the ease of rearranging cooperations among smart devices by updating the cluster spreadsheet, possibly also updating the division of the cluster into connected cluster(s).

All smart devices of cluster 104 are configured to cooperate according to the teachings of the present disclosure. There may be optionally other external devices, that are unaware of the present disclosure, but are still effectively cooperating with smart devices of cluster 104. For example, an external active device 102A, such as a conventional fan or sprinkler, may be effectively controlled by an electronically-actuated socket or valve, respectively, that is an active device that is a connector device 110C (FIG. 2D) that contains a controllable connector unit 120C (FIG. 2C) that controls the supply of a resource, such as electricity or water, that is consumed by the provision of the service by the external active device 102A. An external active device 102A that is electronically controlled by a controller of its own, may be actuated by control signals received from an active device of cluster 104 that is an active bridge device 110B (FIG. 2D). An external information device 102B such as an Internet weather forecast station may be consulted by a data fetcher that acts as a bridge information device of cluster 104. Another example for a bridge information device of a cluster is an Internet receiver that cooperates with an external information device 102B that is a smartphone or a computer, wherein the current state of the bridge information device being user commands received from the smartphone or computer, thereby potentially allowing the user to remotely control any and all active devices of the cluster that take into account the received user commands (current states of the internet receiver) in calculating the target states of respective active units.

Generally speaking, a system 100A that includes a cluster 104, optionally supplemented by external devices, is installed for providing useful services to users by active units of active devices of the cluster and/or optionally by active units of external devices. Exemplary useful services in the home environment are lighting, irrigation, playing music, locking doors, actuating gates, air-conditioning and ventilation; beyond the home environment, exemplary useful services are manufacturing, traffic control and access control. Information devices may affect the provision of the services according to conditions programmed according to the teachings of the present disclosure, and include, but are not limited to sensors, detectors, data fetchers from the internet, and any user-interface elements such as buttons, switches, touchscreens, pointing devices, accelerators, Internet receiver, and cameras that allow users to affect the operation of active units by taking into account users inputs—considered as the current state of the respective information unit(s)—when calculating target states of active units as taught below.

Figure 1B:
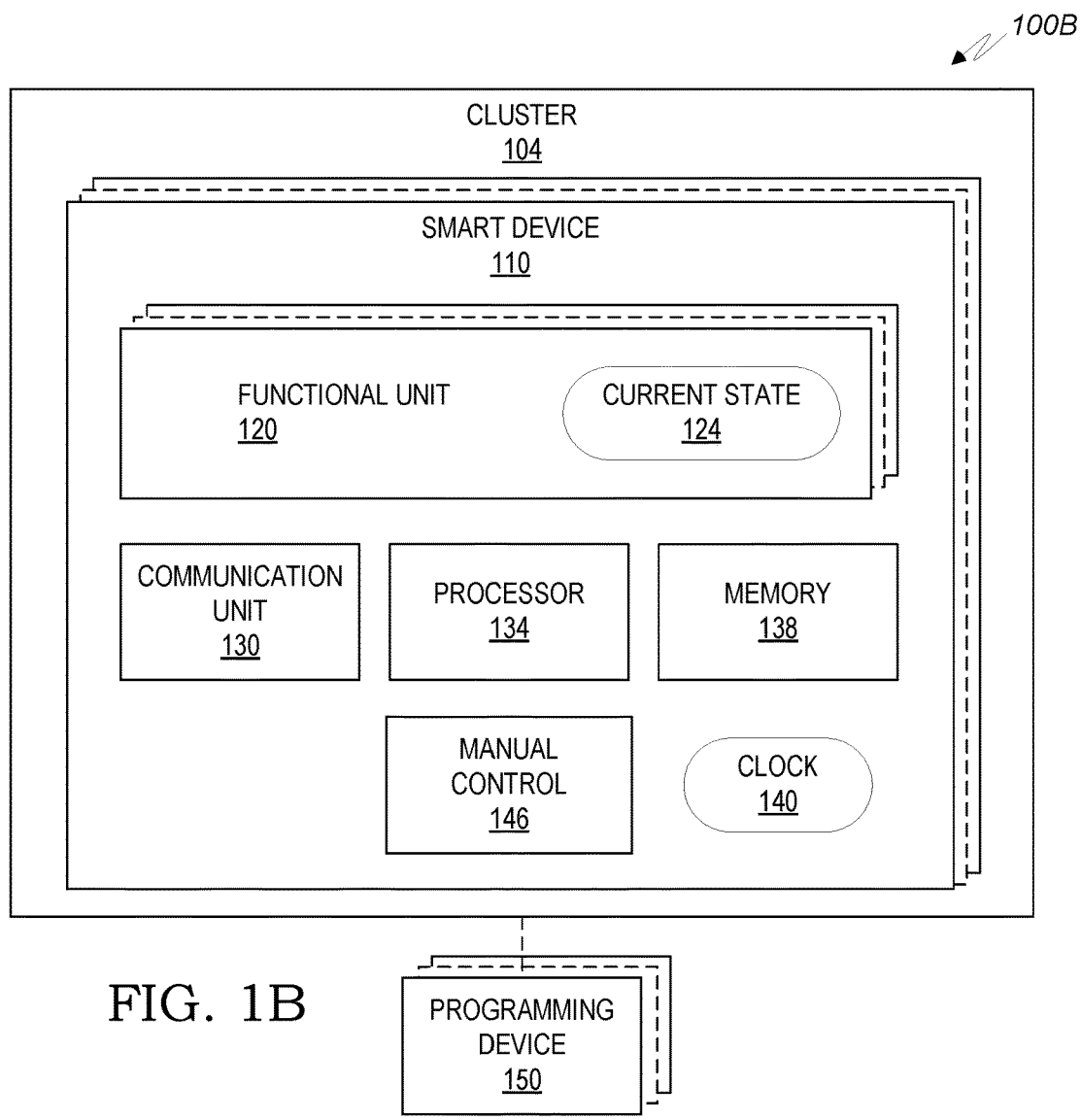

FIG. 1B depicts a system 100B that includes a cluster 104 of smart devices, selectably connectable (i.e. may be connected or disconnected by a user) to one or more programming device 150. Cluster 104 includes a plurality of smart devices 110. Each smart device (with the exception of bridge devices) includes at least one functional unit 120, which serves a purpose and utility of smart device 110, and a communication unit 130 for communicating with other smart devices and with programming device 150. A functional unit 120 is either an active unit or an information unit. An active unit provides a useful service to the user, and its operation is affected by one or more functional units. An information unit may affect the operation of an active unit. A smart device 110 may include several functional units 120; for example, a smart ceiling fan may include a fan unit, a light unit, and a thermometer. If a smart device includes at least one active unit, it is called an active device. For brevity, the functional units of all smart devices that belong to a cluster are collectively referred to as the functional units of the cluster.

Each functional unit may have a current state 124 that measures or characterizes the current condition or output of the functional unit. The current state may be registered in a storage device of the functional unit or of the smart device, and is communicated by the smart device via communication unit 130 to other smart devices of the cluster, possibly affecting the operation of active units. In case of an information unit, the current state is typically the information measured, detected or otherwise obtained by the information unit. In case of an active unit, the current state represents the current activity status of the active unit; for example, in case of an active unit that is the living room light, the current state may be 0 (off), 1 (low) or 2 (high).

It will be noted that active units may be affected by current states not only of information units, but, alternatively or additionally, of other active units. For example, an active unit of a fan may be programmed by the user to turn off in response to an active unit of lights turning off, or, in another example, opening a gate may cause lights to turn on.

Some smart devices may host several functionalities, for example: a ceiling fan that includes both a fan and a light, or a camera that serves as both a motion sensor and license plate reader. Preferably but not necessarily, such smart devices will be considered to include several separate functional units, each having its own state. It will be appreciated, however, that some such devices may alternatively be considered to host a single complex functional unit; for example, a ceiling fan having both a fan unit and a light unit may be considered as including a single complex functional unit of fan+ light that has nine states: 00, 1, 2, 10, 11, 12, 20, 21, 22, where the first digit relates to the fan's off, low and high operation modes while the second digit relates to the light's off, low and high intensity modes.

Memory 138 performs general storage functions in cooperation with processor 134. Additionally, in case of an active device, memory 138 also stores code derived from spreadsheet formula(s), or spreadsheet formulas, or a complete spreadsheet as discussed below. Processor 134 controls the operation of functional unit 120 if the unit is an active unit, and the communication with other devices. Optional real-time clock 140, that may form part of processor 134, may be included in smart device 110, to allow recording the time of changes in current state 124 and optionally affect operations of active smart units, for example, prevent loud music playing at night. Manual control 146 is optionally included in some active devices, for allowing manual override by the user over the programming of a certain functional unit; for example, turn on the light in spite of programming that decides otherwise. Such override preferably causes a corresponding change of the current state 124 that is reported to other smart devices of the cluster.

Programming device 150 is used by a user for programming the cluster and other tasks described below. It communicates with smart devices of the cluster, as described below.

Figure 1C:
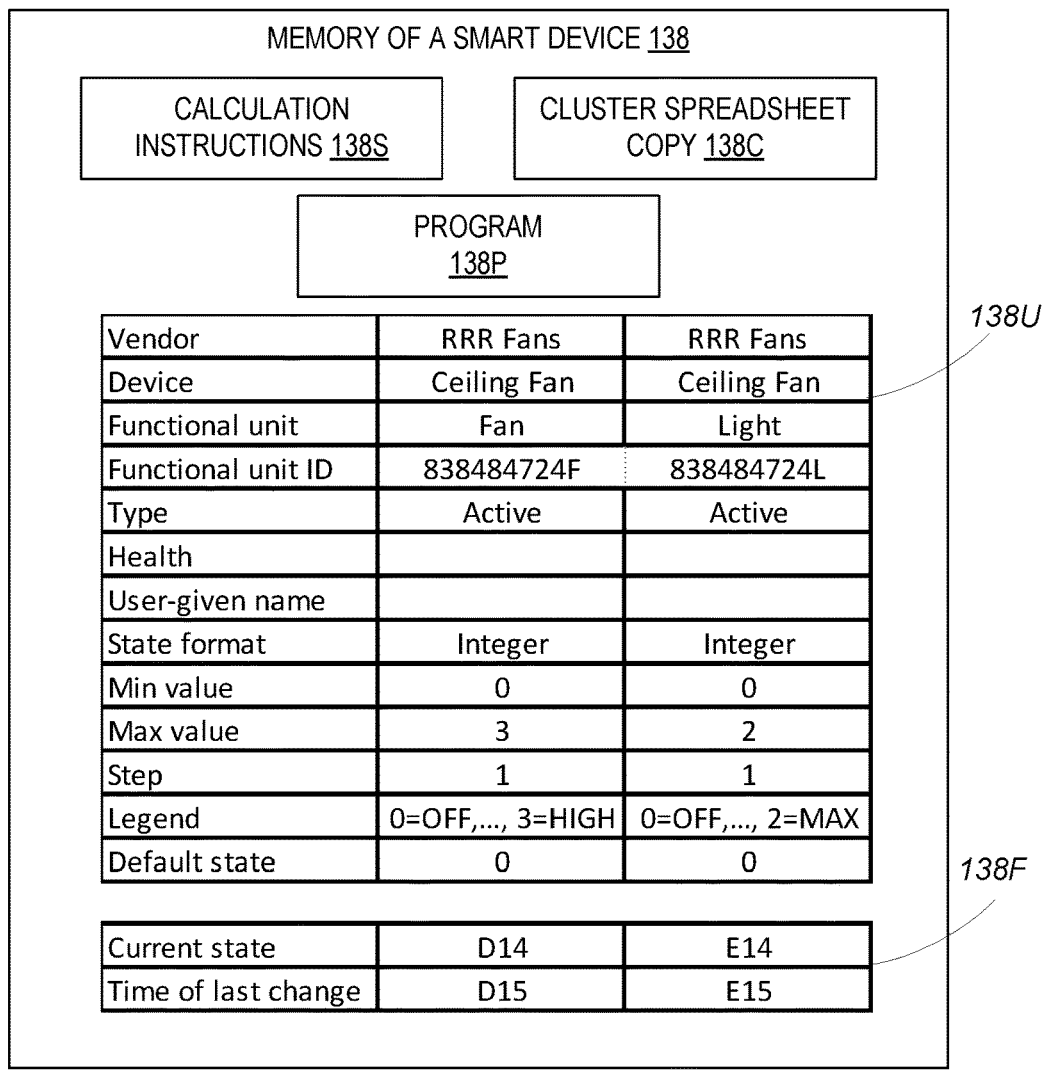
FIG. 1C is a simplified block diagram describing a memory of a smart device.

FIG. 1C demonstrates exemplary contents of memory 138 of FIG. 1B in a preferred embodiment of a smart device 110 of FIG. 1B. Calculation instructions 138S are included in an active device, where they operate processor 134 of the smart device for calculating target state(s) of active unit(s) included in the smart device. Calculation instructions 138S are redundant and may be eliminated in an information device, i.e. in a smart device that includes no active units. Calculation instructions 138S are a complete copy or a portion of a cluster spreadsheet, or a code derived from a spreadsheet, as will be described in more detail below. In case that calculation instructions 138S are not included at all, for example in an information device, or if calculation instructions 138S are less than the complete cluster spreadsheet, then, preferably but not necessarily, memory 138 stores cluster spreadsheet copy 138C, for supporting restoring of the cluster by a programming device, as described below. Program 138P runs on processor 134 of smart device 110 (FIG. 1B) for executing calculation and communication operations; in case of an active device, program 138P interprets calculation instructions 138S for calculating target states and controlling the active unit(s) included in the smart device toward reaching the respective target states; in both active and information devices, program 138P operates to broadcast the current state of the active unit(s) to other smart devices of the cluster. Functional unit table 138U is preferably included in memory 138 and is set by the vendor of smart device 110 (FIG. 1B) to exhibit the characteristics of the functional units included in the smart device, to be used for filling-in operational and guidance information into the cluster spreadsheet via a programming device. Functional unit cells 138F preferably register in memory 138 the column allocated for each functional unit in the cluster spreadsheet, and the specific cells of the cluster spreadsheet allocated for recording the current state and time of its last change, per each functional unit of the smart device. Functional unit cells 138F may simplify the current state messages broadcasted by the smart device into a format such as "D14/2" which indicates that the current state of the fan functional unit of the ceiling fan smart device is now 2, to be easily inserted into cell D14 of all spreadsheets of the cluster.

Figure 1D:
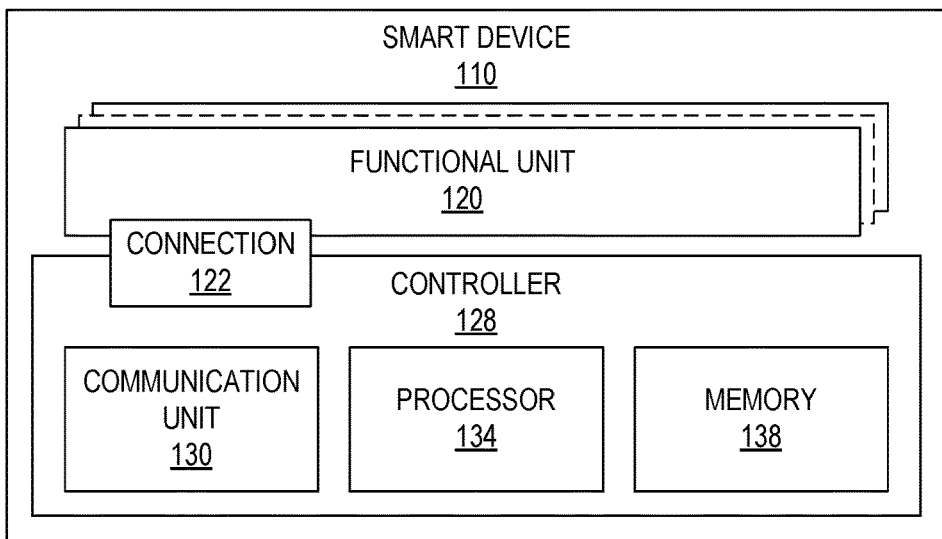
FIG. 1D is a simplified block diagram emphasizing elements of a smart device.

FIG. 1D emphasizes some elements of smart device 110 of FIG. 1B. Smart device 110 includes at least one functional unit 120 (or zero functional units in case of a smart device 110 that is a bridge device), as well as communication unit 130, processor 134 and memory 138 that are collectively called controller 128. It will be noted that the present disclosure distinguishes the functional roles of the communication unit, processor and memory even if they form parts of an integrally-manufactured controller. Connection 122 includes customary attachment components, such as a socket, for physically, electrically and logically connecting controller 128 to functional unit(s) 120 and/or to a body of smart device 110.

FIG. 2A schematically describes programming device 150 of FIG. 1B. Programming device 150 is a computing device that is used by a user for conveniently programming a cluster; examples for programming device 150 include a desktop or laptop personal computer, a tablet computer or a smartphone. Memory 150M stores program 150R running on processor 150P for establishing, running and updating cluster spreadsheet 150S, authoring programming instructions, and communicating with smart devices of the cluster. Communication unit 150C sends to smart devices of the cluster programming commands derived from cluster spreadsheet 150S, and user interface 150U displays cluster spreadsheet 150S and receives user entries for entering values and formulas into the spreadsheet. It will be noted that preferably the cluster operates autonomously, independently of the programming device, when the programming device 150 is disconnected from the cluster. It will be also noted, that the same or another programming device 150 may be later connected to a cluster for updates or restoring. It will be further noted that programs that aid users in authoring spreadsheets via graphical or other interface may be used to facilitate spreadsheet authoring.

FIG. 2B schematically depicts five operation modes 160 of programming device 150 of FIGS. 1B-2A with respect to a cluster. In cluster programming mode 160P a user has designed a cluster of a plurality of smart devices, selected the maker and model of each smart device, and obtained the parameters of each of the smart devices. Thus, for cluster programming mode 160P the user does not need yet to purchase and/or deploy the smart devices, but may obtain the parameters of the smart devices from data sheets or from websites. In this operation mode, the user enters formulas and parameters as further described with reference to FIGS. 3B-3D. During entering formulas, the user gets immediate feedback regarding errors such as in the formula syntax, use of functions, or circular references, and corrects such errors. In cluster simulation mode 160S, which still does not require purchasing and deploying the cluster's smart devices, the user enters various current states and time parameters into the spreadsheet, to simulate a variety of what-if scenarios, which may help in correcting and improving the spreadsheet formulas for better performance of the cluster.

Toward cluster testing mode 160T, the user purchases and deploys the cluster's smart devices, establishes a communication network among all devices of the cluster, and connects the programming device to the cluster so that the programming device can obtain the current states of all functional units of the cluster as reported by all smart devices. The programming device then sends programming commands to all active devices, such as by broadcasting the cluster spreadsheet or a slim version of the cluster spreadsheet to all active devices. The cluster then starts real operation, with all devices performing and cooperating according to their respective columns in the cluster spreadsheet. The user experiences the operation of all active units in the real world, while monitoring all the current states and intermediate calculations shown on the cluster spreadsheet that is displayed by the programming device. The user may then update formulas and parameters on the cluster spreadsheet to correct errors or improve performance and send a fresh set of programming instructions/a fresh copy of the cluster spreadsheet to the cluster's smart devices, and run another round of testing, until he is satisfied, and then may disconnect the programming device from the cluster and leave the cluster for autonomous operation, independently of the programming device. Cluster testing mode 160T is also useful for revealing functions that work fine on the programming device, yet are not recognized by a leaner spreadsheet interpreter of a smart device. Another variation of cluster testing mode 160T is where a programming device running the cluster spreadsheet acts as a temporary hub and the active devices operating in a slave mode under slave program 1254 (FIG. 12), thereby the entire cluster is operating and tested in a hub-based mode 1410 (FIG. 14).

When the user changes his mind with respect to the way the cluster operates, or adds, deletes or replaces one or more smart devices of the cluster, the programming device is connected to the cluster for running in cluster update mode 160U to update the cluster spreadsheet, which is preferably followed by another round of simulation and testing. Cluster restoring mode 160R is called when the user wishes to test or update the cluster, yet the original programming device or the cluster-related files have been lost. In this case, any compatible programming device 150 is loaded with program 150R, and then connected to the cluster to retrieve the cluster spreadsheet from a smart device of the cluster; in case that calculation instructions 138S (FIG. 1C) are identical to the cluster spreadsheet, then calculation instructions 138S may provide the needed copy, otherwise, cluster spreadsheet copy 138C may be retrieved (cluster spreadsheet copy 138C may be absent if calculation instructions 138S are identical to the cluster spreadsheet.) Upon retrieving the cluster spreadsheet, restoring is completed, and the programming device is ready for cluster simulation, testing and/or update.

FIG. 2C categorizes functional units according to the way they affect the provision of a service to a user. A functional unit 120 is either an active unit 120A that controllably performs an action, or an information unit 120N that obtains information that is reported to selectably affect the operation of active device(s). An active unit 120A is either a controllable service unit 120S whose action provides users with a tangible useful service such as lighting, ventilation, music or irrigation; or a controllable connector unit 120C whose action affects the supply of a resource, such as electricity or water, that is consumed by the provision of a tangible useful service by an external active device that is not directly controllable according to the teachings the present disclosure. For example, a controllable connector unit 120C may be an electronically-actuated switch embedded within a wall outlet or socket, that affects the supply of electricity to a conventional light, music player or fan, thereby controlling the operation of the light, music player or fan; or it can be an electronically-actuated valve that controls the supply of water to a conventional sprinkler or irrigation timer.

FIG. 2D categorizes smart devices according to their functional units. A smart device 110 includes a controller and zero or more functional units (zero in case of a bridge device). An information device 110N includes zero or more information unit 120N (zero in case that information device 110N is a bridge information device) and no active units. An active device 110A is categorized as a service device 110S if it includes a controller and at least one controllable service unit 120S; a connector device 110C if it includes a controller and exactly one controllable connector unit 120C; or an active bridge device 110B if it includes a controller only (i.e. no functional unit) and cooperates with an external active device 102A (FIG. 1A) to control its operation.

In view of both FIGS. 1A, 2C and 2D, it will be noted that a cluster is established and operates to provide one or more useful services via at least one service unit associated with the cluster, that is either a controllable service unit included in an active device of the cluster, or a service unit included in an external active device Cluster Spreadsheet The cluster spreadsheet is preferably a cluster programming tool usable by users that are not necessarily professional programmers, for programming a cluster, as well as for simulating and testing the cluster's operation, and updating and restoring a cluster, as described above with reference to FIG. 2B. The cluster spreadsheet is authored and edited via a programming device.

FIG. 3A is a simplified segment of an exemplary blank cluster spreadsheet 300A, such as cluster spreadsheet 150S of FIG. 2A. Cells A1-A17 include exemplary generic row titles. Rows 1-16 of each column B and beyond, are dedicated to a specific functional unit of a smart device of the cluster. The contents of ells marked "V" are to be determined by a vendor of the respective smart device. Cells marked "U" are to be filled by the user. "V/U" denotes a default value initially determined by the vendor but can be modified by the user. "U/D" denotes cells to be filled by the user for cluster simulation and later be determined by devices/functional units during testing and actual operation of the cluster. "(U)" denotes formula cells that are to be filled by the user, but typically just for functional units that are active unit. "V/(U)" denotes state formats that are determined by the vendor, but in some cases, may be modifiable by the user; for example, a thermometer may have a Fahrenheit format that the user may be allowed to change to Celsius. A cluster spreadsheet of the type demonstrated by spreadsheet 300A may serve the five roles described with reference to FIG. 2B.

It will be noted that other spreadsheet sizes, arrangements, titles and conventions may be implemented instead of those described in FIGS. 3A-F, as long as they provide a cluster spreadsheet that performs the functionalities described herein.

For clarity, the roles of the rows will be described with reference to a concrete example in FIG. 3B below. As demonstrated by FIG. 3B, row 18 and below (out of which rows 18-25 are shown), as well as optionally also columns to the right of the last functional unit column (not shown) and/or additional worksheets within the workbook (not shown) are usable as a general scratchpad, allowing the user to enter parameters, tables, databases and/or links, and perform intermediate calculations, as spreadsheet users commonly do in order to break down a complex calculation into several simpler calculation steps or for any other calculation purpose.

FIG. 3B schematically describes an exemplary cluster spreadsheet 300B of a basic cluster that includes three smart devices: a light switch (column B), a thermometer (column C), and a ceiling fan that includes two functional units: a fan (column D) and a light (column E).

To fill-in columns B-E, the user, using a programming device, may download module description such as 300C (FIG. 3C) from each respective vendor's website, and copy/paste the module description into the cluster spreadsheet. Alternatively, the same parameters may be keyed-in manually into the programming device according to a product datasheet, or downloaded automatically from an actual smart device upon first connection between the smart device and a programming device. The user is then prompted to name the functional units of the cluster (row 7), consider changing default states (row 13) and program the active units of the cluster by entering formulas calculating target states into row 16 and optionally also using the scratch pad area (such as row 18 and below) for intermediate calculations. It will be noted that since the exemplary functional units of columns B and C are information units (see row 5), row 16 does not expect formulas in columns B and C.

The rows of a cluster spreadsheet are described herein, using spreadsheet 300B of FIG. 3B as an example. (1) Vendor row is set by the vendor and includes the name of a vendor (usually—manufacturer) of a smart device, to help the user identify the respective device. (2) Device row is set by the vendor and includes the name of the device. (3) Functional unit row is set by the vendor and includes the name of the functional unit, which is often the same as the smart device—if the smart device includes only one functional unit—or has a distinctive name in case of multiple functional units within a smart device, as demonstrated by columns D-E. (4) Functional unit ID is set by the vendor and includes a unique alphanumeric string that identifies specific devices, and is added when specific hardware is recognized by a programming device upon installation and setup, which allows the user to identify specific devices (having the ID marked on the device and its packaging) in case of multiple similar units within the cluster (for example, several thermometers). The functional unit ID also allows a present disclosure associate column letter (e.g. B for the light switch) with the respective unit. Examples for functional unit ID are shown in FIG. 3D. (5) Type is set by the vendor and comes to distinguish between active units and information units. (6) Health is reported by the smart device, and is included in devices that have a self-test feature, where OK, for example, indicates a healthy functional unit, BAD indicates a malfunctioning functional unit which may turn current state into its default state value (rows 14-15), while other text values may be used by the smart device's vendor as messages to the user (for example: LOW BATTERY) to be displayed in testing mode (160T of FIG. 2B). (7) User-given name is entered by the user via a programming device to identify the specific role of a specific functional unit, such as living room switch. (8) State format is set by the vendor and pertains to the way the current state (and also target state for active units) is expressed, such as integer, text, Boolean, etc. It may also indicate measurement units used, and allow the user to select such units, for example Fahrenheit or Celsius (see column C). In case of integer values, rows (9-11), set by the vendor, define the range pf allowed values. (12) Legend is set by the vendor and identifies the meaning of values. (13) Default state is assumed as the current state of a functional unit, in case that the current state is not received, or the functional unit is in BAD health; the default state is originally suggested by the vendor but may be further set by the user; for example, the vendor may suggest that the default state of a light is off while the user may prefer to set it on. (14) Current state is reported by a smart device, and is the current condition or output of a functional unit, such as a fan operating in high mode or a thermometer measuring 65 degrees Fahrenheit. For active units, the current state may be either measured by an internal sensor, or presumed to equal the target state, for example in case of a light unit, or presumed to reach the target state after a predetermined period of time, for example, an air conditioner may be presumed to reach a current state of high 60 seconds after its target state is changed to high. (15) Time of last change in the current state is reported by the smart device along with reporting the current state. (16) Target state calc is a spreadsheet formula entered by the user, for each active unit (columns D-E in the present example) via a programming device, and typically refers to current states of other functional units, and possibly also to times of last change and intermediate formulas included in the scratch pad are (e.g. rows 18 and below). (17) Current time is the actual time derived from a real-time clock of a device running the spreadsheet, and is potentially taken into account by formulas within the spreadsheet.

FIG. 3D demonstrates spreadsheet 300D in programming and simulation modes, where the user has filled in functional unit names in row 7, optionally has updated default states in row 13, and has entered spreadsheet formulas into row 16 for the active devices of columns D and E. The user has also used the scratchpad area under row 18 to enter spreadsheet formulas for intermediate calculations and parameters that are used for calculations, as users of spreadsheets regularly do. In the scenario of FIG. 3D, the programming device is used to establish and program a cluster prior to connecting to the cluster smart devices, or even prior to purchasing the devices; accordingly, the true current state (row 14) and the time of last change (row 15) are unavailable and the current time (cell B17) is irrelevant. For simulating the cluster operation, the user is advised to experiment with entering various values into rows 14, 15 and 17 and observe the calculated results in all cells that include formulas (in the current example: D16, E16, B19 and B20).

FIG. 3E shows spreadsheet 300E that visually demonstrates what the user actually sees, during simulation modes with the data entered in FIG. 3D, and specifically the calculated results show in the formula cells of FIG. 3D, i.e. in cells D16, E16, B19 and B20. According to the present example, the current hour is calculated by cell B19 as 11, the respective light level is calculated by cell B20 as 1, the light unit of column E is set to target state 1 (cell E16) while the fan unit of column D is set to target state 2 (cell D16).

FIG. 3F illustrates cluster spreadsheet 300F in testing mode, where actual smart devices have been purchased, deployed and are communicating with the programming device that is used for testing (see cluster testing mode 160T in FIG. 2B). The IDs of all actual functional units are displayed in row 4, and all current states and the time of their last changes are shown in rows 14-15, based on actual values received from the respective smart devices, and may be interpreted by the processors of smart devices of the exemplary cluster for operation.

Device Programming

As described above, a cluster is established and programmed by a user using a programming device, and then preferably the cluster continues autonomous operation independently of the programming device or any other hub. For autonomous operation, every active device is individually programmed to receive from other smart devices the current states of their functional unit(s) and respective time stamps, and calculate, for each of its active units, the target state based on the spreadsheet formula entered by the user into row 16 of the active unit's respective column within the cluster spreadsheet (see, for example, cells D16 and E16 in spreadsheet 300D of FIG. 3D), that possibly references other spreadsheet formulas and parameters entered by the user into the cluster spreadsheet's scratchpad area (see, for example, cells B19-B20 and B22-B23 in spreadsheet 300D). For autonomously performing such operations, each active device is programmed by the programming device toward operation and/or testing (cluster testing mode 160T in FIG. 2B).

Programming an active device of a cluster by a programming device is made via a programming message including instructions for calculating a target state of an active unit of the active device according to one or more spreadsheet formula(s). Such a message can have various forms, as discussed with reference to FIG. 4 below.

In one embodiment, the programming message sent by the programming device is of a device spreadsheet that is a copy of cluster spreadsheet 300F of FIG. 3F. The processor of the active device receiving such a message is programmed to interpret the spreadsheet and is aware of the spreadsheet column(s) allocated for the active unit(s) included in the smart device. Thus, the active device's processor interprets the device spreadsheet (which is the same as the cluster spreadsheet) to calculate the target state(s) of its active unit(s), and then controls the active unit(s) for reaching the respective calculated target states.

In another embodiment of device spreadsheet 300G of FIG. 3G, since smart devices do not benefit from human-oriented formatting, the programming message received by a smart device from a programming device may include a plain text version of the cluster spreadsheet, such as spreadsheet 300G of FIG. 3G, that is a CSV (comma separated values) version of cluster spreadsheet 300F.

Spreadsheet 300H of FIG. 3H demonstrates a device spreadsheet in CSV format that is a transpose of spreadsheet 300G of FIG. 3G. Thus, both cluster spreadsheets and device spreadsheets may allocate a row per active unit, rather than allocating a column per active unit in the other exemplary spreadsheets. Thus, the spreadsheet representation of a cluster taught by the present disclosure is not limited to allocating a column per active unit.

Since smart devices do not benefit from contents used for user guidance, the guidance cells from cluster spreadsheet 300F of FIG. 3F may be cleared, leaving a programming message including a slim CSV-format device spreadsheet as demonstrated by device spreadsheet 300J of FIG. 3J. It will be noted that the formulas and parameters in the scratchpad area need to be included in the slim spreadsheet if they are referenced, directly or indirectly, by the target state cells of the active units included in the active device. In case of larger clusters that include several active devices, the device spreadsheet may be further trimmed per active device by removing cells that are not affecting the target state(s) of the active unit(s) of the current active device.

Essentially, the spreadsheets of FIGS. 3F-3H and 3J have the same effect on the smart devices that interpret them for operation. The advantage of spreadsheet 300F of FIG. 3F is, however, the uniformity of the spreadsheet across all active devices of the cluster as well as the programming device(s). Such uniformity implies that all active devices of the cluster include the cluster spreadsheet, which allows any compatible programming device, even if it is unfamiliar with the cluster, to get immediately acquainted with the cluster and start full operation upon first communication with any active device of the cluster. This advantage shall be further appreciated by recognizing that actual clusters may operate for years before requiring update, upgrade or maintenance, and any programming device that was originally involved in the initial setup of the cluster may have retired or been lost (see cluster restoring mode 160R of FIG. 2B). If, however, for engineering or other considerations, the programming of the smart device is made by less than the cluster spreadsheet, then advantageously a complete copy of the cluster spreadsheet may be copied during cluster programming, for cluster restoring purpose, to devices of the cluster (see cluster spreadsheet copy 138C in FIG. 1C).

The inclusion of a copy of the cluster spreadsheet in information devices is optional, for cluster-level redundancy. Otherwise, an information device does not need a spreadsheet for its operation within the teachings of the present disclosure.

Figure 4:
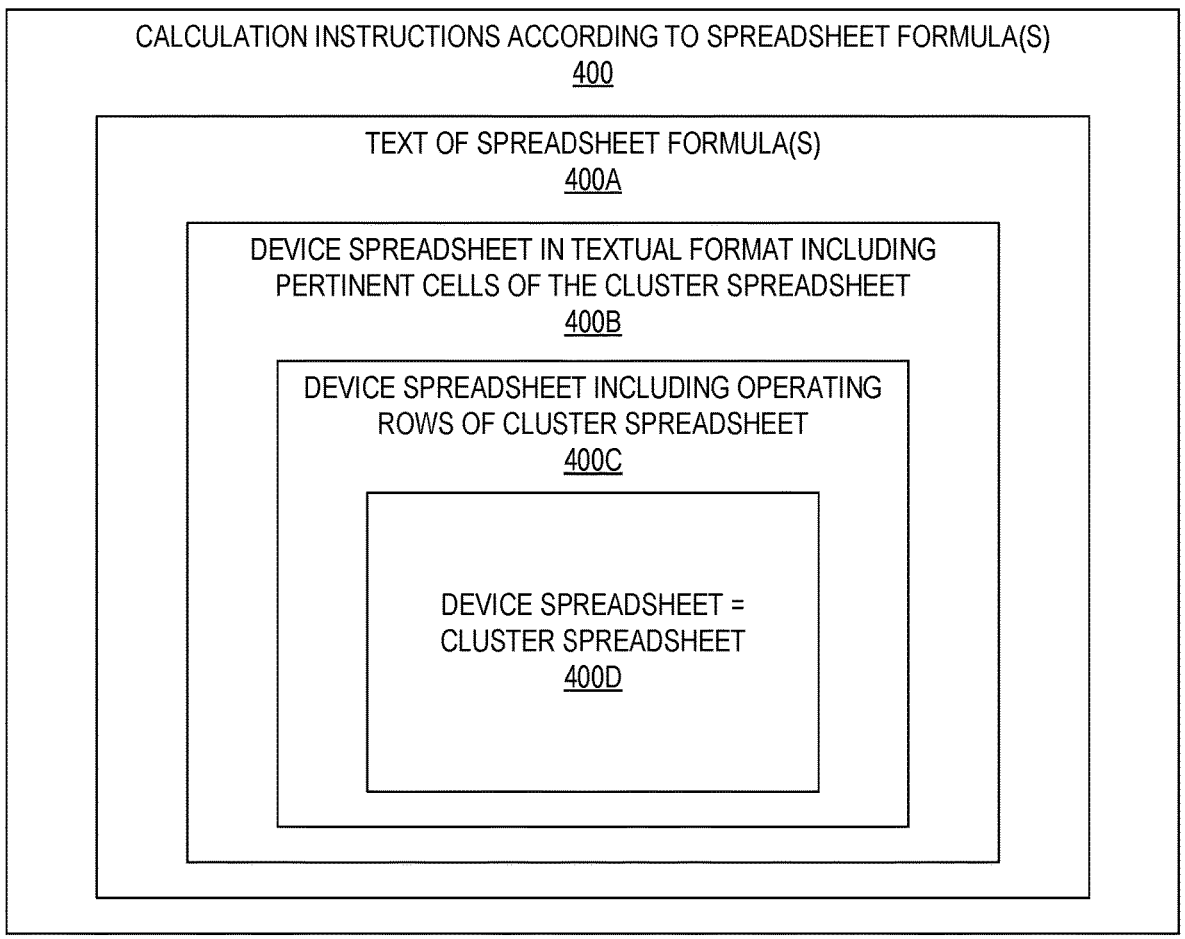
FIG. 4 is a diagram presenting various possibilities for the content of programming messages provided by a programming device to be stored by a smart device.

FIG. 4 schematically summarizes various possibilities for the content of a programming message sent by a programming device to an active device during setup or update of a cluster. Essentially, the basis for programming an active device is spreadsheet formulas included in the cluster spreadsheet, such as spreadsheet 300D of FIG. 3D, that possibly references other spreadsheet formulas in the scratchpad area of the spreadsheet. By compilation of the spreadsheet with focus on calculating the target state of a selected active unit, code may be generated by the programming device for running on the processor of the respective active device, for operating the selected active unit, hence the broad expression "calculation instructions according to spreadsheet formula(s)" 400 of FIG. 4. A more specific embodiment is that of "text of spreadsheet formula(s)" 400A, where the programming message sent from the programming device to an active device includes text of actual spreadsheet formulas such as IF(E14=0,0,(IF(C12<=68,0,(IF(C12<=75,1,(IF(C12<=80,2,3)))))))). This embodiment allows each programming message to include merely formulas and references relevant to the selected active device, thus different active devices may receive and store different programming messages. Embodiment 400B is similar to 400A, except that the formulas and cells are organized in a format of a textual device spreadsheet (such as in CSV or tab-delimited text format) derived from the cluster spreadsheet, hence the respective active device's processor is programmed to interpret data and formulas organized as a spreadsheet. Embodiment 400C pertains to exemplary spreadsheet 300H of FIG. 3H, where all active devices of the cluster store the same, partial version of the cluster spreadsheet, in formats such as XLSX, CSV or TXT; while embodiment 400D pertains to exemplary spreadsheet 300F of FIG. 3F, where the device spreadsheet=cluster spreadsheet. It will be noted that embodiments 400B-400D require the processors of the active devices of the cluster being programmed for interpreting spreadsheets.

With reference to the exemplary embodiments of FIGS. 3F-3H, it shall be noted that when the smart device programming is made via a complete or partial cluster spreadsheet, each smart device shall preferably but not necessarily be aware of the spreadsheet column dedicated to each functional unit included in the smart device, such that: (i) messages reporting health or current state and the time of its last change (rows 6, 14-15) are sent by smart devices in association with the corresponding column(s) of the included functional unit(s), and (ii) each active device retrieves the target state(s) of its active unit(s) from the result in row 16 of the column(s) corresponding to each active unit. Alternatively, functional units may be identified, when sending and interpreting health, current states and times of last change update messages, by their functional unit ID (row 4 in the exemplary spreadsheets) being attached to each message.

Embodiment 400D/300F, where all active devices of a cluster store the cluster spreadsheet, that is ready to run on a programming device and interact with a user, offers many advantages of simplicity, reliability, cluster maintenance, the ability to broadcast a single programming message to all smart devices of the cluster, and straightforward restoring of a cluster by a programming device retrieving the cluster spreadsheet from any active device of the cluster. However, FIG. 4 demonstrates that there are also other viable possibilities that may work, under the broad definition of calculation instructions according to spreadsheet formula(s), which may work better for some processors of smart devices with limited storage and processing capacity.

Cluster Programming Process

Figure 5A:
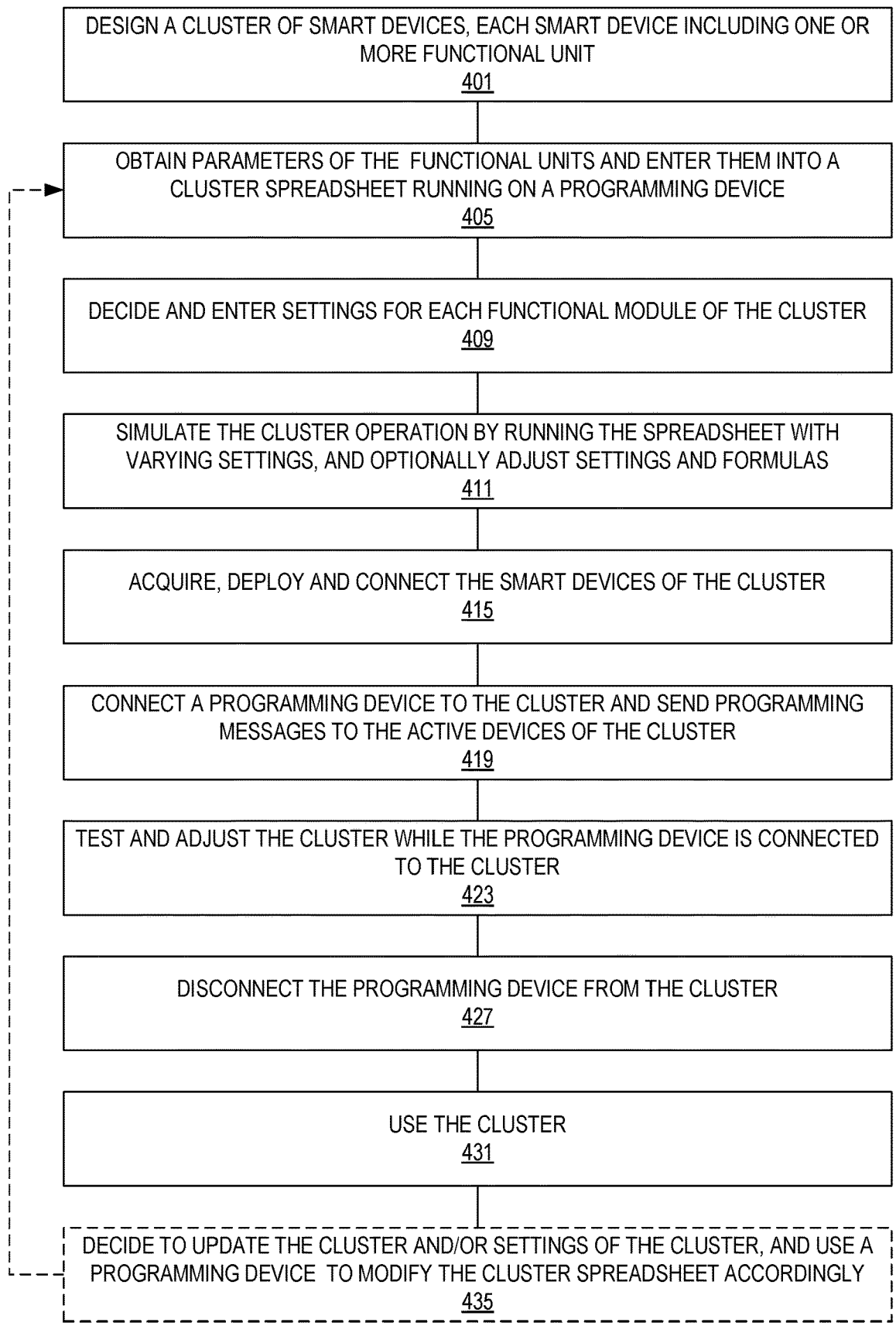
FIG. 5A is a flowchart describing an exemplary process of programming a cluster.

FIG. 5A schematically depicts programming of a cluster of smart devices by a user. In step 401, the user designs a cluster of smart devices that he/she wants to acquire, deploy and use, each smart device including one or more functional unit(s). In step 405, the user uses a programming device, for example a laptop computer, for establishing a cluster spreadsheet including the smart devices of the cluster, as demonstrated, for example, by spreadsheet 300B of FIG. 3B, where parameters of individual modules, for example module description 300C of FIG. 3C, are obtained via the internet, from datasheets, or from the respective smart devices. In step 409, the user decides and enters into the cluster spreadsheet settings for each functional unit of the cluster, including formulas for calculating target states for active devices, as demonstrated, for example, by spreadsheet 300D of FIG. 3D. In step 411, the user simulates the cluster (cluster simulation mode 160S of FIG. 2B) by running the cluster spreadsheet with varying settings, until he/she is satisfied with the operation of the simulated cluster. In step 415, the user acquires and deploys the smart devices of the cluster and connects them to a cluster network so that each smart device of the cluster can communicate with each other smart device of the cluster, for example via a Wi-Fi or BLE (Bluetooth low energy) network. In step 419, a programming device, that can be the same programming device used in step 405 or another programming device loaded with the cluster spreadsheet, is connected to the cluster and sends programming messages to all active devices of the cluster, each programming message is for calculating a target state of an active unit according to the respective formula cells of the cluster spreadsheet. The programming message may be in any of the forms summarized in FIG. 4. In step 423 the user tests the cluster (luster testing mode 160T of FIG. 2B) by observing the operation of all active devices in the real world while monitoring, on the screen of the programming device, the current states of all devices, as well as the results of intermediate calculations. The user may adjust formulas and parameters to correct errors and improve performance. In step 427 the programming device is preferably disconnected from the cluster, leaving the cluster to autonomously operate in step 431, which may last for days, months or years. In optional step 435, the user decides to repair, add, remove or replace smart devices of the cluster, or just improve performance, and then uses a programming device for such reprogramming, starting again from step 405. It will be appreciated that in step 435, the user may use a programming device that is unacquainted with the present cluster, and connect with any active device of the cluster to retrieve the cluster spreadsheet (cluster restoring mode 160R of FIG. 2B).

Figure 5B:
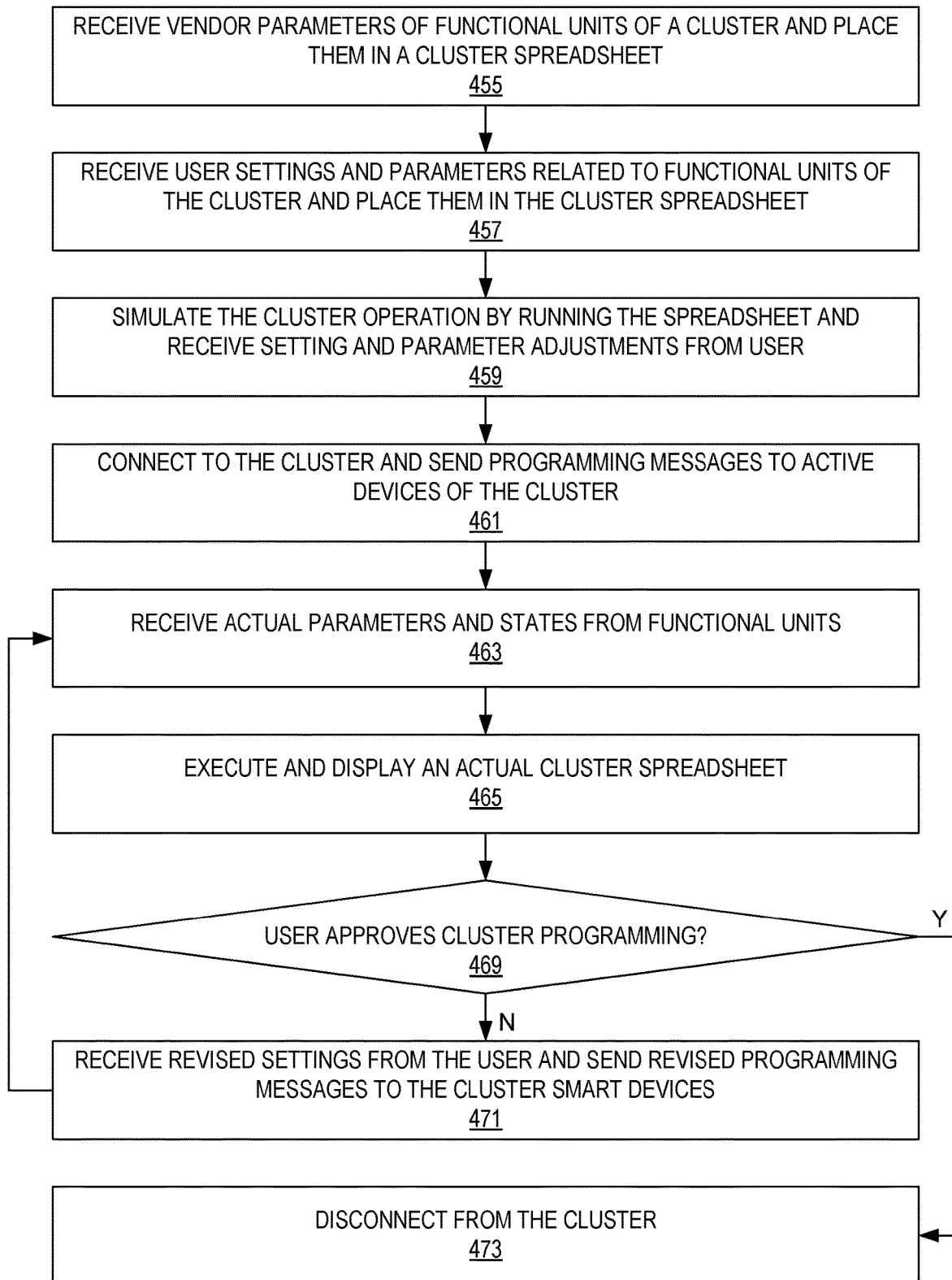
FIG. 5B is a flowchart describing an exemplary process of operating a programming device.

FIG. 5B schematically depicts the operation of a programming device, such as programming device 150 of FIGS. 1B and 2A. In step 455, the programming device establishes a cluster spreadsheet and receives general vendor parameters for all functional units included in the cluster, as demonstrated, for example, by spreadsheet 300B of FIG. 3B. Such vendor parameters are entered by the user or, in some embodiments, may be read from smart devices when connected to the programming device. In step 457, the programming device receives from the user settings (including formulas) and parameters related to functional units of the cluster, and places them in the cluster spreadsheet, as demonstrated, for example, by spreadsheet 300D of FIG. 3D. In step 459, the programming device simulates the cluster (cluster simulation mode 160S of FIG. 2B) by running the cluster spreadsheet, allowing the user to enter varying parameters and settings and view the calculated results, as demonstrated, for example, by spreadsheet 300E of FIG. 3E. In step 461, the programming device is connected to the cluster, and then sends programming messages to all active units of the cluster, for example, by broadcasting the cluster spreadsheet to all active devices, or by sending a customized device spreadsheet to each active device. In step 463, while still connected to the cluster, actual current status parameters from all functional units of the cluster are received and in step 465 the received parameters are displayed, along with calculation results, so the user actually runs a live test of the cluster (see cluster simulation mode 160S of FIG. 2B). In step 469 the programming device receives from the user an indication whether the user approves the cluster programming, in which case, in step 473 the programming device is disconnected from the cluster and the cluster is left to operate autonomously, independently of the programming device. Alternatively, in step 471 the programming device receives revised settings from the user, sends updated programming messages to the smart devices, and diverts to step 463 for another round of live testing.

Figure 5C:
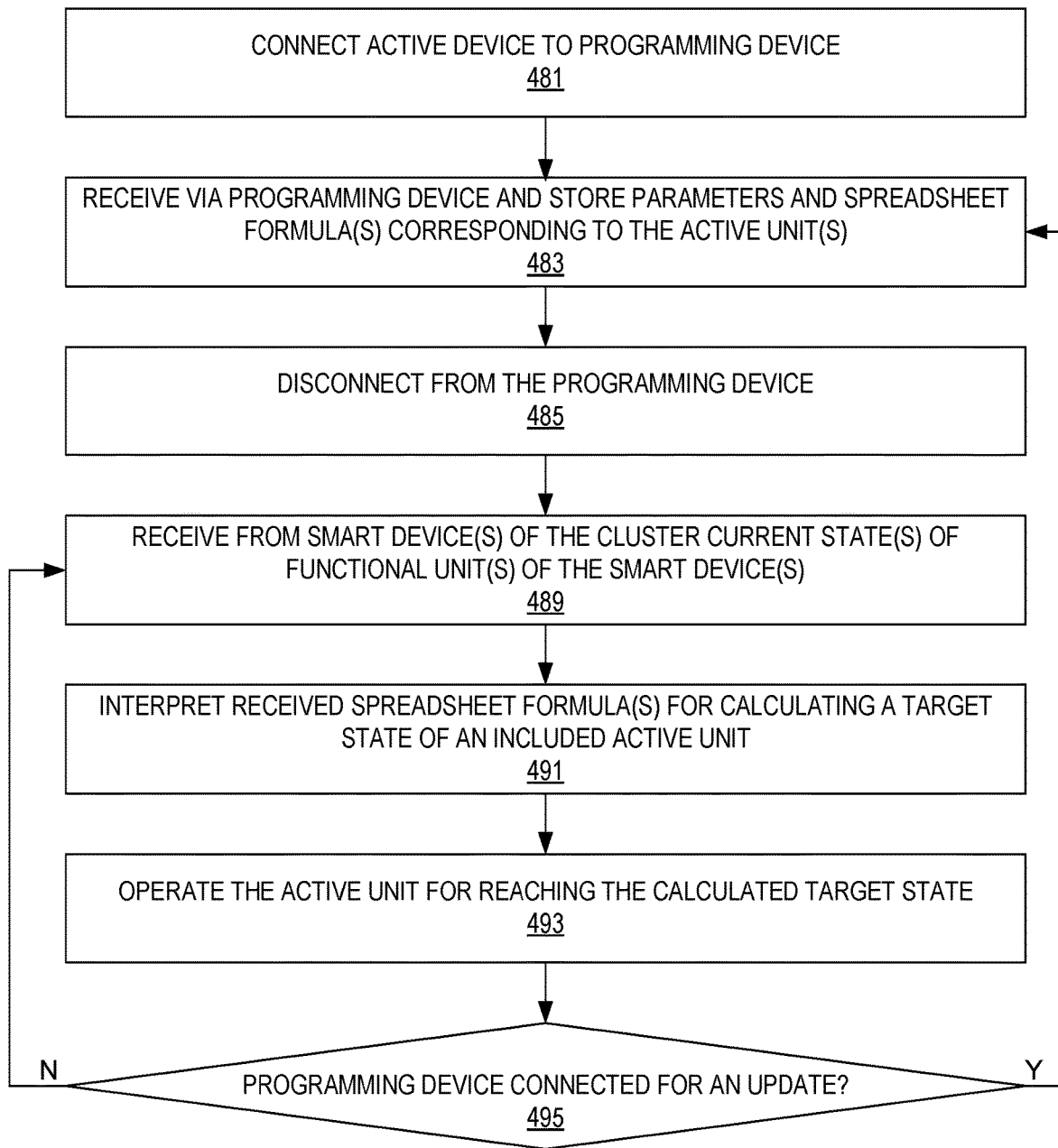
FIG. 5C is a flowchart describing an exemplary process of operating a processor of a programming device.

FIG. 5C depicts the operation of a processor of an active device. In step 481 the active device connects to a programming device via the cluster network. In step 483, the active device receives from the user, via the programming device, parameters and spreadsheet formula(s) that the user has entered into the programming device, and in step 485 the programmed active device is disconnected from the programming device. In step 489, the active device receives current states of functional unit(s) from other smart device (s) of the cluster, and in step 491, the active device interprets the spreadsheet formula(s) received in step 483, to calculate a target state of an active unit of the active device. If the target state is different than the current state of the active unit, then in step 493 the processor operates the active unit for reaching the calculated target state. If in step 495 the active device is reconnected to a programming device for updating the programming, then the process diverts to step 483 for another round of programming, otherwise the process diverts to step 489, waiting for changes in current states of other devices to trigger a change of state of an active unit of the active device.

Figure 6:
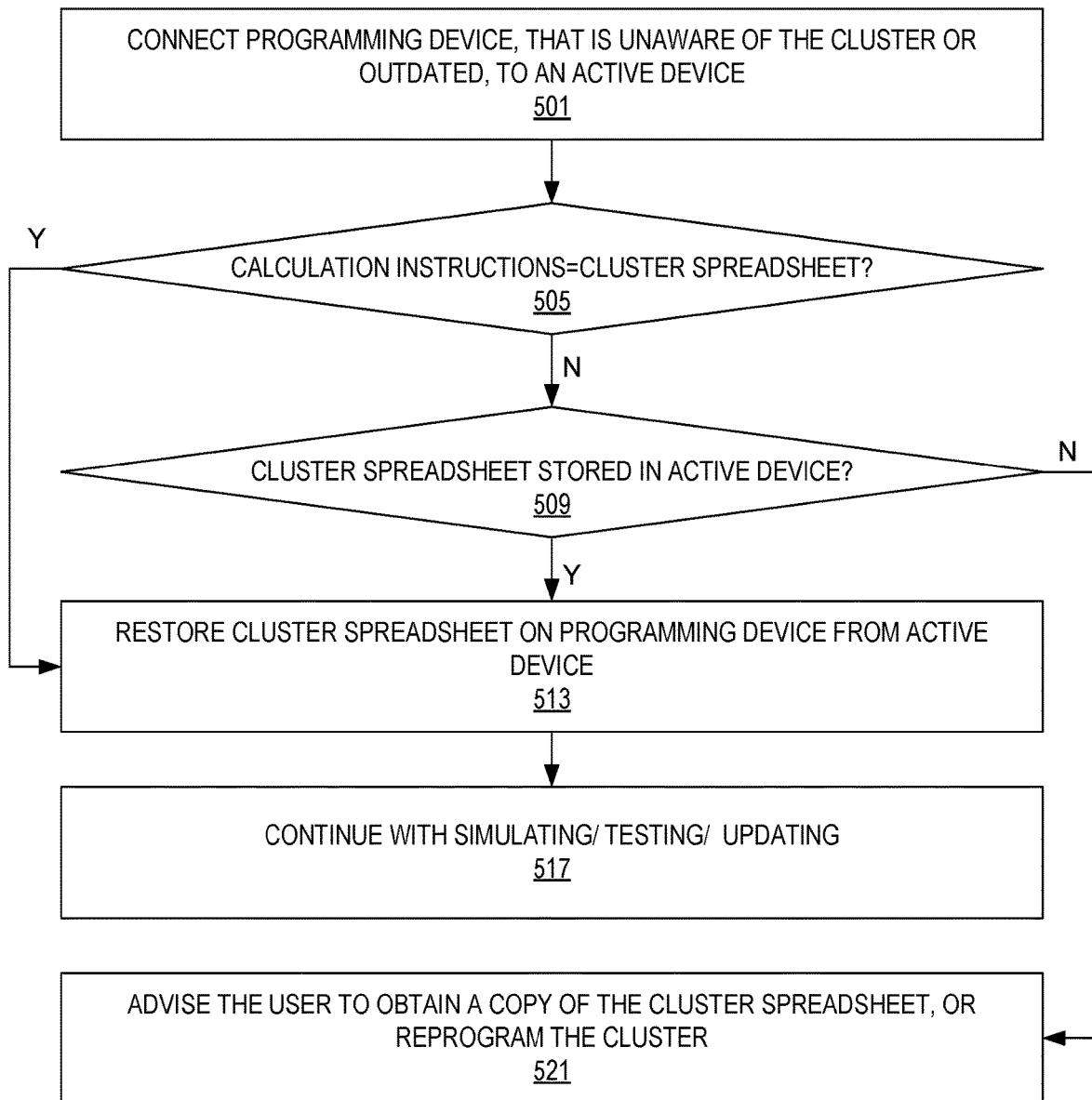
FIG. 6 is a flowchart describing an exemplary process of restoring a cluster spreadsheet from the memory of an active device.

FIG. 6 schematically depicts cluster restoring mode 160R of FIG. 2B. In step 501, a programming device that is unaware of a cluster or outdated, for example as in the case that another programming device was used for updating a cluster, is connected to an active device of the cluster. With reference also to FIG. 1C, step 505 checks whether, according to the cluster configuration parameters (not shown), calculation instructions 138S stored in the memory of the active device are in the form of a copy of the cluster spreadsheet, and, if so, the process continues with step 513 of restoring the cluster spreadsheet on the programming device from the programming instructions on the active device. If the step 505 test fails, then step 509 checks the availability of a copy of the cluster spreadsheet in cluster spreadsheet copy 138C in the memory of the active device, in which case the process continues with step 513 of restoring the cluster spreadsheet on the programming device from the cluster spreadsheet copy 138C on the active device. In step 517, the programming device continues with any of cluster simulation mode 160S, cluster testing mode 160T or cluster update mode 160U. If both tests 505 and 509 fail, then the user is advised in step 521 to obtain a cluster spreadsheet copy from another source, or reprogram the cluster from scratch.

User-Configurable Active Units

As described above, an active device is supplied for deployment with its state parameters which pertain to its active units being predefined by the vendor that supplies the active device. In some cases, the vendor may provide configuration options and tools for configuring the smart device according to specific needs and preferences.

For example, a vendor of a general-purpose robotic arm may provide a joystick built into the device, or an application program interfacing with the device, to allow the user to define ten specific positions of the robotic arm that correspond to states 0-9 of the robotic arm. This way, active devices can be customized according to specific uses, before cooperation among smart devices is programmed via a cluster cooperation program such as a cluster spreadsheet.

User Programming of Information Units

The following description uses spreadsheets as a convenient, yet not exclusive, programming environment for teaching and demonstrating the concept of user programming of information units, Cluster programming by users has focused above on programming the active devices of a cluster to calculate target states of active units according to current states of selected functional (information and/or active) units, and/or time parameters. Accordingly, in some embodiments, information devices, i.e. smart devices that include one or more information units but no active units, may lack programming by user, or even lack provisions for programming by users. In other embodiments, however, programming of information devices by users may be desirable for performance, efficiency and/or ease of cluster spreadsheet programming, and, accordingly, provisions for programing by users may be included also in information devices.

As described above, information units of a cluster measure, detect or otherwise obtain information that may affect the operation of active units of the cluster. The vendor or developer of an information unit determines the type and format of the information provided by the unit by default. During programming of a cluster, the user authors spreadsheet formulas for calculating target states of active units according to current states of functional units and/or time parameters. It may be found by the user and/or by the vendor of an information unit (actually, of a smart device that includes the information unit) that the raw information provided by the information unit is insufficient or inconvenient to work with in authoring the spreadsheet formulas, which is the motivation for the provision of programming information units by users, as described below.

Figures 7, 8A:
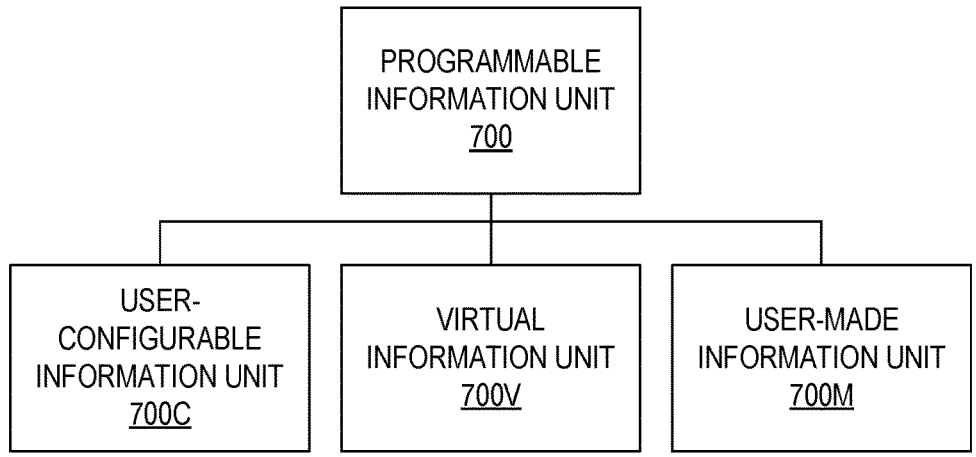

FIG. 7 schematically introduces three types 700 of programmable information units: (i) user-configurable information unit 700C, (ii) virtual information unit 700V, and (iii) user-made information unit 700M. The three types of programmable information units are described in the following sections. It will be noted that actual programming of information units according to types 700C and 700M is implemented in the controllers of the smart devices that include such information units. It will also be noted that the three types 700 of programmable information units are not mutually exclusive within a cluster of even within a smart device; thus, a certain smart device may include a user-configurable information unit 700C and a user-made information unit 700M and be associated with a virtual information unit 700V.

User-Configurable Information Units

User-configurable information unit 700C pertains to a case where a vendor of a certain information unit (actually, of a smart device that includes the information unit) provides a configuration tool—such as a computer or smartphone application program, or a manual switch or DIP switch—that is usable for configuring the information unit prior to programming the cluster. An example is a camera used for motion detection within a certain inspection area. The user deploys the camera in its intended service spot, and may use a vendor-supplied application program to view the actual inspection area via the camera, draw polygons within the inspection area seen on the screen to define zones, and number or name the zones. The user configuration is then recorded in the smart device by the vendor's application program, so that subsequently the smart device is configured to autonomously report to the cluster devices a current state of the camera (information unit), which is the number or name of a zone where a motion is currently detected by the camera. The user may then author a spreadsheet formula for calculating a target state of an active unit of the cluster, such as a garage gate, to respond to motion detected in selected zone(s).

Another example is of a thermometer measuring temperature by default in degrees Fahrenheit, with its vendor providing users with a hardware switch or a software tool for configuring the thermometer to report temperature in degrees Celsius or Kelvin.

After an information unit is configured by a user, it may be added to a cluster with its unit description 300C (FIG. 3C) updated according to the actual configuration made by the user.

Virtual Information Units

A virtual information unit is optionally added to a cluster spreadsheet and device spreadsheets without affecting the current state actually reported by any smart device with respect to any physical information unit. Virtual information unit 700V of FIG. 7 is demonstrated by an example of cluster spreadsheet 800A of FIG. 8A. The FIG. 8A scenario is of a user establishing a cluster of two smart devices: a ceiling fan and an ambient thermometer. The user wishes to program the cluster so that the fan is turned on and off according to the current temperature reported by the thermometer. However, the user's difficulty is that the thermometer reports the current temperature in degrees Celsius, while the user is accustomed to degrees Fahrenheit. To overcome the difficulty, the user uses a programming device such as programming device 150 of FIG. 1D to extend cluster spreadsheet 800A of FIG. 8A into cluster spreadsheet 800B of FIG. 8B, by adding column D of a virtual ambient thermometer that virtually reports temperatures in degrees Fahrenheit. Thus, current state cell D14 includes the Fahrenheit representation of the current temperature originally measured and reported in degrees Celsius by the genuine thermometer corresponding to column C. The user further enters a formula into cell B16 for programming the fan's operation, where he/she uses '80' as the threshold temperature expressed in degrees Fahrenheit, while the referenced temperature is that calculated by current state D14 of the Fahrenheit-oriented virtual thermometer unit of column D.

FIG. 8C demonstrates the user experience of working with a virtual information unit when programming, simulating or testing the cluster spreadsheet. Actually, the user sees cluster spreadsheet 800C with calculation results appearing in cells D13, D14 and B16. The user who established column D for his convenience, actually ignores the inconvenient Celsius-oriented column C of the genuine thermometer, which can be even hidden by the user, and works exclusively with the Fahrenheit-oriented virtual thermometer of column D.

It shall be noted that: (i) The virtual device of column D has a similar impact to, and could be eliminated and substituted by entering a Celsius-to-Fahrenheit conversion formula within the scratchpad area of the cluster spreadsheet, and the presentation of a 'Fahrenheit thermometer' in a format of a functional unit in column D is a matter of user convenience and perception. (ii) The actual functional unit—the ambient thermometer of column C—is the only unit actually reporting the temperature current state to the cluster, which continues to be in degrees Celsius. (iii) The current state formula of cell D14 is distributed, as an intermediate calculation formula, when a programming device sends programming messages to the cluster devices (the fan in the present scenario). (iv) In autonomous cluster operation, the Celsius-to-Fahrenheit conversion is actually performed at the affected active devices (the fan in the present example) and not at the reporting information unit (the thermometer). (v) A single information unit may yield more than one virtual information unit; for example: bathroom scales in kg units may yield both virtual scales in lb. units, as well as a virtual identifier-by-approximate-weight of the family member using the scales. (vi) Calculation of the current state of the virtual information unit may involve intermediate calculations within the spreadsheet's scratchpad area.

User-Made Information Units

A user-made information unit is added by a user to a smart device, by the user using a programming device for programming the smart device that includes an information unit. Thus, the smart device will include a new user-made information unit whose current state is reported similarly to the current state of any other information unit. As an example, to a smart device that includes an information unit (thermometer) whose current state is measured and reported in degrees Celsius, the user adds another user-made information unit whose current state is reported in degrees Fahrenheit. It will be noted that the user-made information unit option is available only if the vendor of the respective smart device includes programming provisions in the controller of the information device, so that the controller of the information device is capable of calculating a to-be-reported current state according to spreadsheet formulas derived from a user-authored spreadsheet.

FIG. 9A depicts an exemplary cluster spreadsheet 900A of a cluster that originally includes a ceilings fan active unit (column B) and a Celsius thermometer information unit (column C). In the present scenario, the user, when using a programming device, finds Celsius degrees inconvenient for programming that target state of the active unit (cell B16) according to the current state of the information unit (cell C14) because he/she is accustomed to degrees Fahrenheit, and therefore creates a new user-made Fahrenheit thermometer by adding column D, including the conversion formulas. Additionally, the user enters special annotation(s) that signal to the programming device that column D of FIG. 9A is meant to create a user-made information unit rather than a virtual unit as in column D of FIG. 8B. Exemplary annotations are 'user' in cell D1 and an extended serial number in column D4 that associates the information unit of column D with that of column C.

When the programming device sends programming instructions to the smart devices of the cluster, the minimum instructions received by the thermometer smart device are derived from spreadsheet 900B of FIG. 9B. Thus, the thermometer smart device now includes a new information unit corresponding to column D whose current state D14 is calculated by the thermometer smart device and reported by the thermometer smart device to the cluster smart devices as the current temperature in degrees Fahrenheit.

It shall be noted that: (i) User-made information unit necessitate interpretation of calculation instructions stemming from spreadsheet-originated formulas also in information devices. (ii) The original functional unit—the ambient thermometer of column C—may continue to report the current temperature in degrees Celsius. (iii) The current state calculated by the thermometer active device in cell D14 is distributed by the thermometer active device as any other current state reported with respect to an active unit. (iv) A single information unit may add more than one user-made information unit; for example: bathroom scales in kg units may yield both user-made scales in lb. units, as well as a user-made identifier-by-approximate-weight of the family member using the scales. (v) Calculation of the current state of the user-made information unit may involve intermediate calculations within the spreadsheet's scratchpad area, to be interpreted by the controller of the smart device that included the user-made information unit.

To reemphasize a difference between the virtual information unit 700V and the user-made information unit 700M, it will be noted that the former is interpreted by processors of active devices that includes active units affected by the virtual information unit, while the latter is interpreted by the processor of the smart device that includes the user-made information unit. Thus, a virtual information unit does not necessitate execution of calculation instructions derived from spreadsheet formulas by the smart device that includes the referenced original information unit (Celsius thermometer in the examples of FIGS. 8B-9B), while a user-made information unit executes calculation instructions derived from spreadsheet formulas by the smart device that includes the referenced original information unit.

Sophisticated Information Devices

Simple information devices, such as a manual switch reporting what a user wants to happen or a thermometer reporting the current temperature, are associated with a single parameter to be reported by information devices and calculated by spreadsheet formulas. More sophisticated information devices may provide multi-parameter information. For example: a text messaging receiver may provide both a message content and a sender identifier, or an access-control camera at a parking garage may provide both the color of a car and its license place number. In such cases: (i) The vendor of a smart device may establish a separate information device per parameter, for example the text messaging receiver device will appear as two separate information devices (two columns for the cluster spreadsheet): one is a sender reporter and the other is a message content reporter; (ii) The vendor provides information device programming options (700M) for programming the device as including user-made information units, and the user breaks down a multi-parameter report into multiple single-parameter reports; (iii) The user establishes virtual information units (700V); or (iv) The user uses the scratchpad area of the cluster spreadsheet for breaking down multi-parameter reports into single parameters used for calculations.

Additionally, cluster spreadsheets may include multiple current state and target state rows to accommodate multiple-parameter states. Thus, within the spreadsheet column of a parking garage camera that reads both the car color and the license plate number, two rows may be used so that the current state reported by the camera occupies a cell for the detected color and another cell for the read license place number. In another example, the target state of an air-conditioner may occupy two cells: one for the target temperature and the other for the blower speed.

Advantages and Conclusion

The hub-less architecture makes the cluster lean (eliminating the hub), reliable (avoiding a single point of failure) and secure and private (avoiding unnecessary connections to the Internet and the Cloud). Furthermore, in embodiments that use a cluster spreadsheet for the cluster cooperation program, clusters become programmable by many users and handymen that are not professional programmers, which makes clusters more manageable, flexible and modular; also, using ubiquitous spreadsheets for programming current state and devices eases standardization, hence promoting interoperability among smart devices offered by different vendors.

The invention is about autonomous cooperation among smart devices of a cluster. To clearly distinguish between a cluster and a single device and emphasize cluster-characteristic features, the claimed clusters include at least one information device and at least two active devices.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A controller for controlling active units included in smart devices, the controller comprising:
   a connection for connecting the controller to an active unit included in a smart device;
   a communication unit for:
      receiving spreadsheets, that include spreadsheet formulas, from programming devices, and
      receiving from smart devices current states of functional units of the smart devices;
   a memory for storing a spreadsheet received from a programming device via the communication unit; and
   a processor programmed to autonomously:
      interpret the spreadsheet stored in the memory to calculate a target state of the active unit connected to the controller according to: (i) one or more of the spreadsheet formulas, and (ii) one or more of the current states of functional units received via the communication unit, and
      control the active unit connected to the controller for performing an action according to the calculated target state.

2. The controller of claim 1, wherein the processor and the communication unit are further operable to provide to programming devices the spreadsheet stored in the memory for restoring a cluster of smart devices.

3. The controller of claim 1 further comprising a real-time clock, and wherein the processor is further operable to interpret spreadsheet formulas that include time parameters.

4. A controller for controlling active units included in smart devices, the controller comprising:
   a connection for physically, electrically and logically connecting the controller to an active unit included in a smart device;
   a communication unit for:
      receiving spreadsheets, that include spreadsheet formulas, from programming devices, and
      receiving from smart devices current states of functional units of the smart devices;
   a memory for storing a spreadsheet received from a programming device via the communication unit; and
   a processor programmed to autonomously:
      interpret the spreadsheet stored in the memory to calculate a target state of the active unit connected to the controller according to: (i) one or more of the spreadsheet formulas, and (ii) one or more of the current states of functional units received via the communication unit, and
      control the active unit connected to the controller for performing an action according to the calculated target state.

5. The controller of claim 4, wherein the processor and the communication unit are further operable to provide to programming devices the spreadsheet stored in the memory for restoring a cluster of smart devices.

6. The controller of claim 4 further comprising a real-time clock, and wherein the processor is further operable to interpret spreadsheet formulas that include time parameters.

* * * * *